(12) United States Patent
Azzali

(10) Patent No.: US 12,168,578 B2
(45) Date of Patent: Dec. 17, 2024

(54) COLLECTOR WITH DIVERTER APPARATUS FOR COLLECTING ARTICLES

(71) Applicant: EMS GROUP S.P.A., Montecchio Emilia (IT)

(72) Inventor: Corrado Azzali, Montecchio Emilia (IT)

(73) Assignee: EMS GROUP S.P.A., Montecchio Emilia (IT)

( * ) Notice: Subject to any disclaimer, the term of this patent is extended or adjusted under 35 U.S.C. 154(b) by 0 days.

(21) Appl. No.: 17/767,693

(22) PCT Filed: Oct. 9, 2020

(86) PCT No.: PCT/IB2020/059495
§ 371 (c)(1),
(2) Date: Apr. 8, 2022

(87) PCT Pub. No.: WO2021/070128
PCT Pub. Date: Apr. 15, 2021

(65) Prior Publication Data
US 2024/0116718 A1    Apr. 11, 2024

(30) Foreign Application Priority Data
Oct. 10, 2019 (IT) .......................... 102019000018494

(51) Int. Cl.
*B65G 47/51* (2006.01)

(52) U.S. Cl.
CPC ................. *B65G 47/5104* (2013.01)

(58) Field of Classification Search
CPC ............ B65G 47/5104; B65G 47/5109; B65G 47/5131; B65G 47/71; B65G 47/66; B65G 47/5127
See application file for complete search history.

(56) References Cited

U.S. PATENT DOCUMENTS

| 9,394,117 B2 * | 7/2016 | Hanselman ........ B65G 47/5109 |
| 9,415,947 B2 * | 8/2016 | Steeber .................... B65G 1/00 |
| 2016/0052726 A1 | 2/2016 | Steeber |
| 2016/0130093 A1 | 5/2016 | Hanselman |

FOREIGN PATENT DOCUMENTS

EP    0373060 A1    6/1990

* cited by examiner

*Primary Examiner* — William R Harp
(74) *Attorney, Agent, or Firm* — Carmel Patent Agency; Robert Ballarini

(57) ABSTRACT

A collector includes a diverter apparatus in which a transfer device is adapted to divert a flow of articles from a belt conveyor to a collecting table to create a plurality of parallel rows, or vice versa, said belt conveyor being arranged orthogonal to the collecting table so that said articles, passing from the belt conveyor to the collecting table and/or vice versa, are diverted, thus defining an angle preferably of 90°, the belt conveyor and collecting table are arranged adjacent to one another.

14 Claims, 17 Drawing Sheets

COLLECTOR WITH DIVERTER APPARATUS FOR COLLECTING ARTICLES

FIELD OF THE INVENTION

The present invention relates to the field of systems for collecting articles or packages such as, for example bottles, cans, jars, glasses, cartons, and generally containers, that pass on conveyors belonging to lines adapted to produce and/or fill and/or package said articles.

BACKGROUND

The lines for producing and/or filling and/or packaging containers comprise a series of belt conveyors that allow articles to pass from one work station to the other, i.e. from one machine to the next one where such machines (e.g. blower, filler, labeler, etc.) are arranged according to a sequence set by the production/filling/packaging process. During operation, said machines require stop times for reintegrating consumables, or for short maintenance operations; in order to prevent these stops from creating continued stops of the line, thus affecting the productivity thereof, it often becomes necessary to create article collection areas between one work station and the next that are capable of containing the articles processed by the machines upstream during the stop of machines downstream. Said collected articles are put back onto the line when the aforesaid machines downstream are restarted. Said collection systems generally are "FIFO" systems, i.e. First In First Out systems.

Various types of collectors are known comprising planar belt conveyors, among which a feeder conveyor, a collecting table and an output conveyor. The collecting table is of the multiple storage type, i.e. with several parallel conveyors. A first transfer device brings the products or articles from the feeder conveyor to the collecting table, and in particular in turn to one of the several parallel conveyors.

A second transfer device brings the products or articles from the collecting table, in particular in turn, from one of the several parallel conveyors, to the output conveyor.

Generally, the feeder conveyor and the output conveyor are positioned far from the collecting table.

Indeed, said distance is required to house means for handling the transfer device that are placed between the conveyors and the collecting table and below the work surface thereof. A stationary joining surface that acts as protection and connection between the feeder conveyor and the collecting table or between the collecting table and the output conveyor is placed above said transfer device handling means. The width of said stationary joining surface is to be sufficiently large to close the distance between conveyors and collecting table and allow the bottom of the articles to be supported during passing.

The problems that may result from said very wide stationary joining surface are mainly associated with the fact that the bottom of the article drags on said surface, generating:
  damage to the bottom of the articles;
  reduction in the speed of the passing article due to the dragging friction on said surface;
  destabilization of the article after the release.

Since the width of the joining surface is much greater than the base of an individual article, the passing articles are to be pushed towards the collecting table or the output conveyor and cannot be simply guided. This does not allow making a transfer device of simple and affordable type in which the guide means are stationary, rather requires the presence of movable guides such as powered belts.

For example, the transfer devices are shaped so as to provide two opposite guide members, an outer one and an inner one, which guide surfaces come into contact with the articles. Said guide surfaces generally are belts that translate in the transfer direction of the product.

An example of solution for the aforesaid problems is described in document EP3013924 that provides for the transfer device to comprise guide surfaces shaped with special profiles of the flexible fin type adapted to lift the articles from the stationary joining surface to prevent them from being damaged by dragging on it.

Moreover, said fins also serve to prevent the article, being pushed on a larger stationary joining surface than the bottom itself of the article, from reducing the passing speed thereof due to the dragging friction on said surface, or from being destabilized after the release.

Therefore, the significant distance between feeder or output conveyor and collecting table required to house transfer device handling means imposes the use of a complex and costly transfer device that prevents or at least minimizes the dragging of the product on the surface of the joining surface in the gripping position.

Furthermore, said significant distance between feeder or output conveyor and collecting table results in the guide surfaces, or at least the one of the outer member, to be shaped so as to provide substantially rectilinear input and/or output profiles that are mutually joined by means of a curvilinear profile.

This becomes necessary to maintain contained overall dimensions of the transfer device.

Indeed, if the guide surfaces did not have rectilinear length, the curved profiles would be much larger due to the significant distance between conveyors and collecting table.

The forwarding speed of the belt of the inner guide element and the outer one are to be such as to ensure that the article in contact with both is forwarded without rotating about the axis of symmetry thereof. Indeed, the consequence of the rotation especially of non-circular, e.g. rectangular articles, such as cartons would be a messy collection of said articles on the conveyors of the collecting table.

The speeds of the inner guide element and the outer one should be equal in the rectilinear profile length, while they should be proportional to the radius of curvature in the curvilinear profile length so that the article that is passing in the transfer device is forwarded without rotating.

Therefore, given that several articles pass in the transfer device simultaneously that are simultaneously in contact both with the rectilinear and curvilinear profiles, it is apparent that the speed of the belts cannot vary between curvilinear profile length and rectilinear profile length. Therefore, there is a need to find a compromise between the two speeds. This results in the articles arriving on the collecting table or on the output conveyor partially rotated, reducing the collecting capacity of the belt and creating output alignment problems.

SUMMARY

The technical problem at the basis of the present invention is the one of making available in the technique, a structurally and functionally improved collector conceived to overcome one or more of the above-disclosed limitations with reference to the mentioned known technique.

Within the scope of the aforesaid problem, it is a main object of the invention to develop a collector that allows ensuring the integrity and correct arrangement of the articles, in particular the articles that are not circular in shape.

It is also an object of the present invention to allow an easily accessible control and maintenance solution for the operator.

It is a further object of the invention to make available in the technique, a collector within the scope of a simple, rational and highly affordable solution.

These and other objects are reached by the characteristics of the invention set forth in the independent claims. The dependent claims outline preferred and/or particularly advantageous aspects of the invention.

In particular, an embodiment of the present invention makes available a collector comprising a diverter apparatus 300 in which a transfer device 301 is adapted to divert a flow of articles from a belt conveyor 100, 200 to a collecting table 400 to create a plurality of parallel rows 601, or vice versa, said belt conveyor 100, 200 being arranged orthogonal to the collecting table 400 so that said articles 600, passing from the belt conveyor 100, 200 to the collecting table 400 and/or vice versa, are diverted by 90°, characterized in that said belt conveyor 100, 200 and collecting table 400 are arranged adjacent to one another.

Thanks to this solution, the bottom of the article remains more stable, is not damaged in the passage from belt conveyor to collecting table.

In particular, the belt conveyor comprises a forwarding chain which preferably extends along the entire width of the collecting table, which in turn provides storage conveyors comprising at least one collecting chain, preferably a plurality of parallel collecting chains; said forwarding chain and collecting chain are arranged orthogonal and adjacent to one another.

Another aspect of the invention is the one of making available a solution in which forwarding chain and collecting chain are arranged so that a distance between the forwarding chain and the first plane point of a winding portion of the collecting chain is minimal, and as a function of the winding radius of said collecting chain and/or the configuration of said collecting chain.

Therefore, the space in which the bottom of the article is not supported by moving chains is so small that it prevent slowdowns or erroneous arrangements of the article during the forwarding thereof.

In particular, to improve the aforesaid aspect, a possible embodiment provides for the distance to be smaller than the resting surface of the bottom of the article, preferably the smallest.

In this solution, it is possible to provide for a passage member, preferably of a stationary type, between the forwarding chain and the collecting chain, the passage member being configured to close said distance and support a portion of the resting surface of the bottom of the passing article by means of the transfer device.

In this way, the article remains stable because the bottom thereof is always resting also thanks to the fact that a preferred embodiment provides for the passage member to comprise at least one substantially planar surface adapted to create a support for the bottom of the article.

Furthermore, to allow the article to pass from the belt conveyor to the collecting table in an increasingly reliable manner, the invention provides for the transfer device to comprise guide means configured to engage with the articles by means of a transfer surface that comprises a circumferential portion.

The transfer surface preferably consists of a circumferential portion to further avoid the rotation of the articles, especially those with non-cylindrical shape.

In this way, the speed of the guide means of the transfer device may be regulated in an optimal manner.

To increasingly ensure this aspect, said guide means comprise outer guide means and preferably inner guide means in which the respective transfer surfaces contact each article in two points that are substantially diametrically opposite or on opposite faces of said article, and preferably said transfer surfaces are arranged concentrically with respect to one another.

Thanks to this solution, the circumferential portion of the transfer surface of the outer guide means comprises an input end that is tangent to an outer edge respectively of the forwarding chain and an outlet end that is tangent in turn to a forwarded edge of the collecting chain onto which it transfers the articles; therefore said transfer surface does not have rectilinear length in input or in output.

Preferably, the invention provides different configurations of the guide means.

For example, an embodiment provides for the transfer surface of the outer guide means and/or the transfer surface of the inner guide means to comprise a stationary guide.

Thanks to this solution, a transfer device is obtained that benefits the affordability of making the apparatus.

An alternative embodiment provides for the transfer surface of the outer guide means and/or the transfer surface of the inner guide means to comprise a movable guide that translates according to the forwarding direction of the article.

Thanks to this solution, a transfer device is obtained that benefits the transfer reliability of the articles.

Said objects and advantages are all achieved by the collector the object of the present invention, which is characterized by the provisions of the claims below.

BRIEF DESCRIPTION OF THE DRAWINGS

These and other features will be more apparent from the following description of certain embodiments illustrated by way of non-limiting example in the accompanying drawings.

DETAILED DESCRIPTION OF THE PREFERRED EMBODIMENTS

With regards to the constructional characteristics of the collector, indicated as a whole by 500, it comprises a diverter apparatus 300 configured to divert a flow of articles 600 from a belt conveyor 100, 200 to a collecting table 400 of said articles 600.

In particular, said articles 600 or containers such as, for example bottles, cans, jars, glasses, cartons, and generally containers, pass on conveyors belonging to lines adapted to produce and/or fill and/or package said articles 600.

During operation, the machines of said production and/or filling and/or packaging lines require stop times for reintegrating consumables, or for short maintenance operations; in order to prevent these stops from creating continued stops of the line, thus affecting the productivity thereof, it often becomes necessary to create collection areas of the articles 600 between one work station and the next that are capable of containing the articles 600 processed by the machines upstream during the stop of machines downstream. Said collected articles 600 are put back onto the line when the aforesaid machines downstream are started again.

In particular, the diverter apparatus 300 diverts the flow of articles 600 onto said collecting table 400 when the machines upstream of the collecting table 400 are stopped.

Preferably, said collecting table 400 is configured to arrange and transfer the articles 600 according to a plurality of parallel rows 601.

One or more embodiments of a collecting table 400 are described in detail by non-limiting examples with reference to the accompanying drawings.

Figure 1:
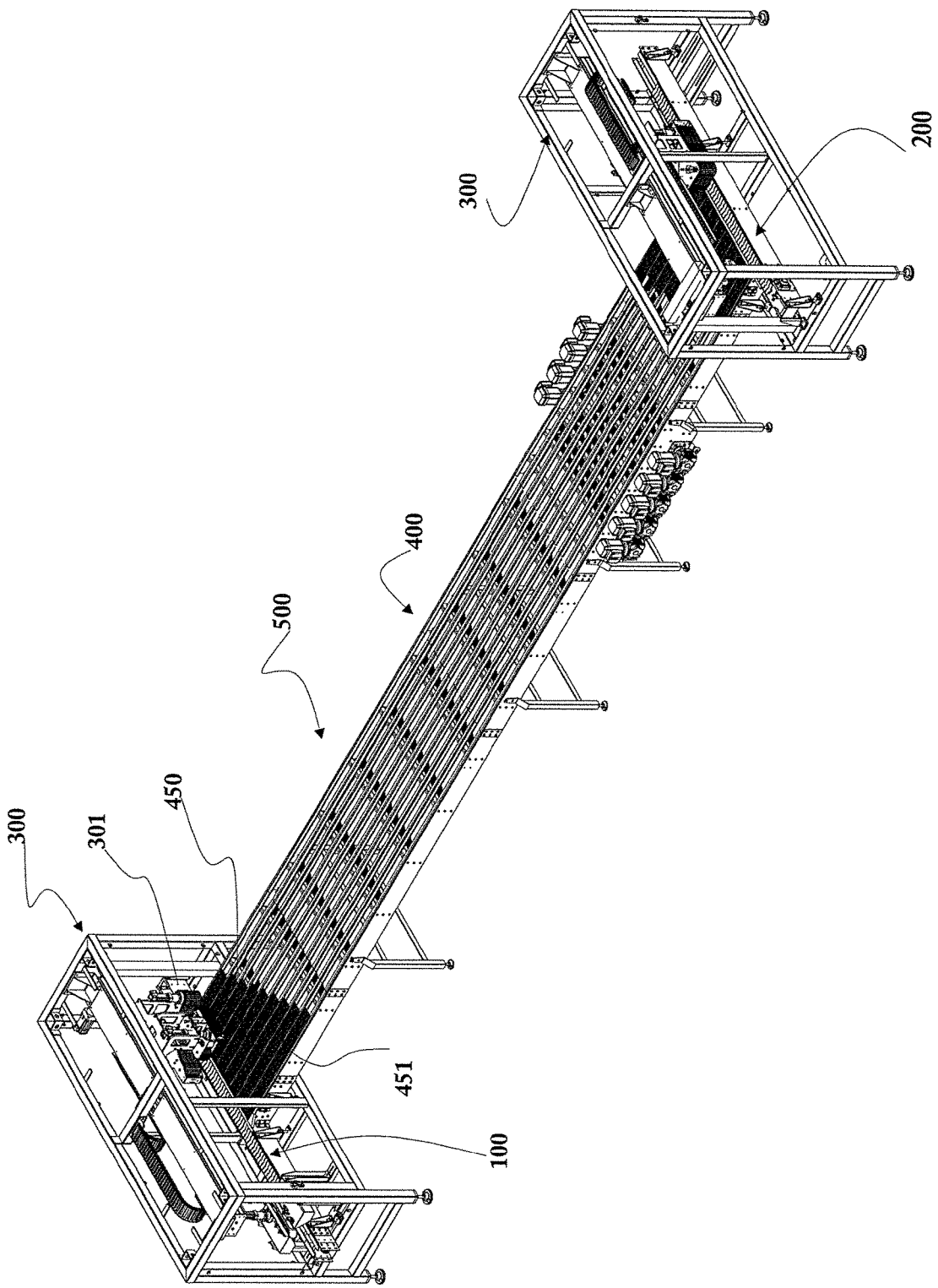
FIG. 1: shows an axonometric view of the diverter apparatus with collecting table, conveyor in input and in output.

As shown in FIG. 1, the collecting table 400 may comprise several storage conveyors 450 arranged parallel to one another.

FIG. 1 shows a certain number of storage conveyors 450, although any other quantity is conceivable, this depending on the buffer capacity required by the line.

Said storage conveyors 450 preferably are forwarded independently of one another so that each of them may receive and eject a single row 601 of articles 600.

Figure 2:
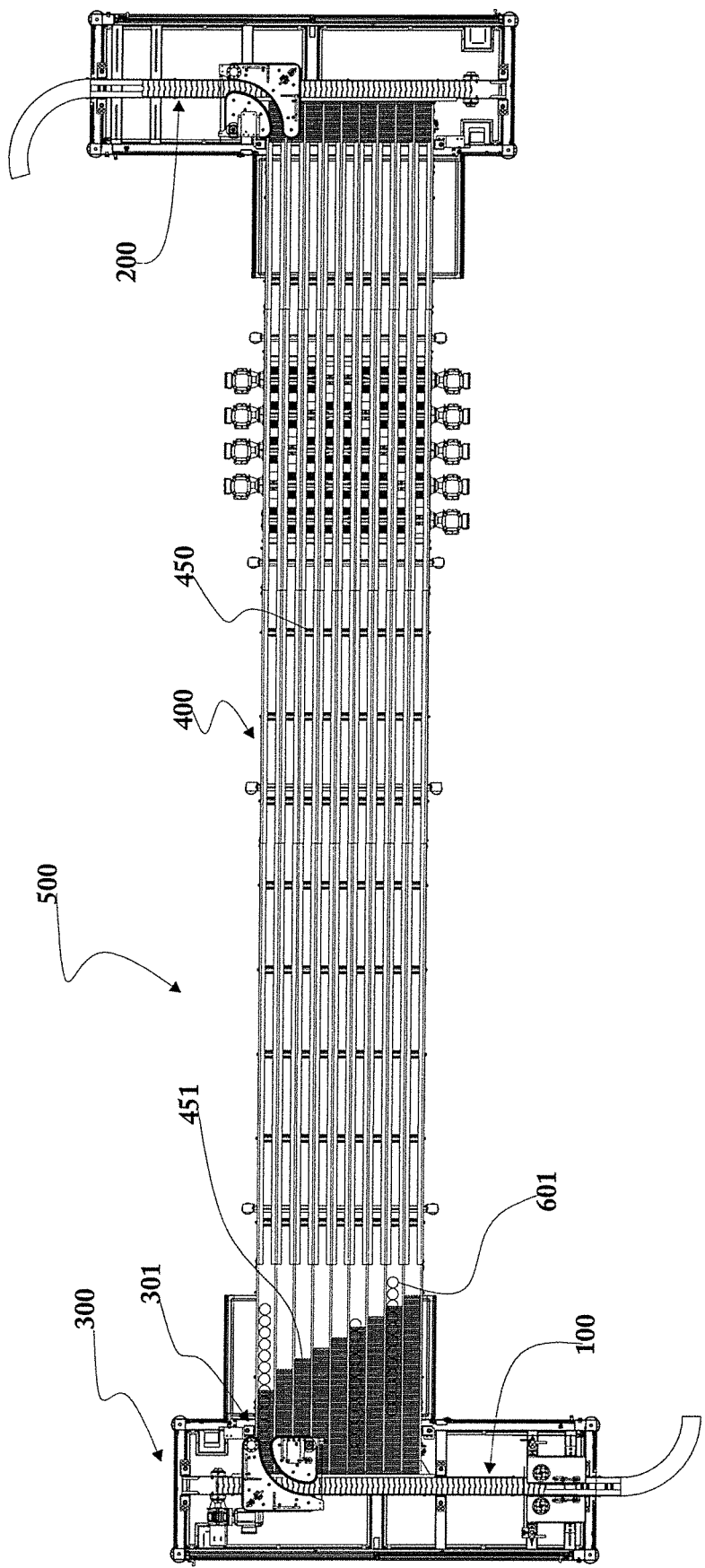
FIG. 2: shows a schematic plane view of the diverter apparatus with collecting table, conveyor in input and in output.

As shown in FIGS. 1 and 2, said belt conveyor 100, 200 is arranged orthogonal to the collecting table 400, and therefore to each storage conveyor 450.

The term belt conveyor 100, 200 means both the belt conveyor 100 in input for feeding the articles 600 to the collecting table 400 and the belt conveyor 200 in output for ejecting the articles 600 from the collecting table 400.

Said articles 600, passing from the belt conveyor 100 in input to the collecting table 400 or from the collecting table 400 to the belt conveyor 200 in output, are diverted by 90°. Indeed, the diverter apparatus 300 comprises a transfer device 301 that is movable along the belt conveyor 100 or 200 so that it may transfer such articles 600 between the belt conveyor 100 or 200 and any one of the plurality of rows 601 provided on the collecting table 400.

Figure 3A:
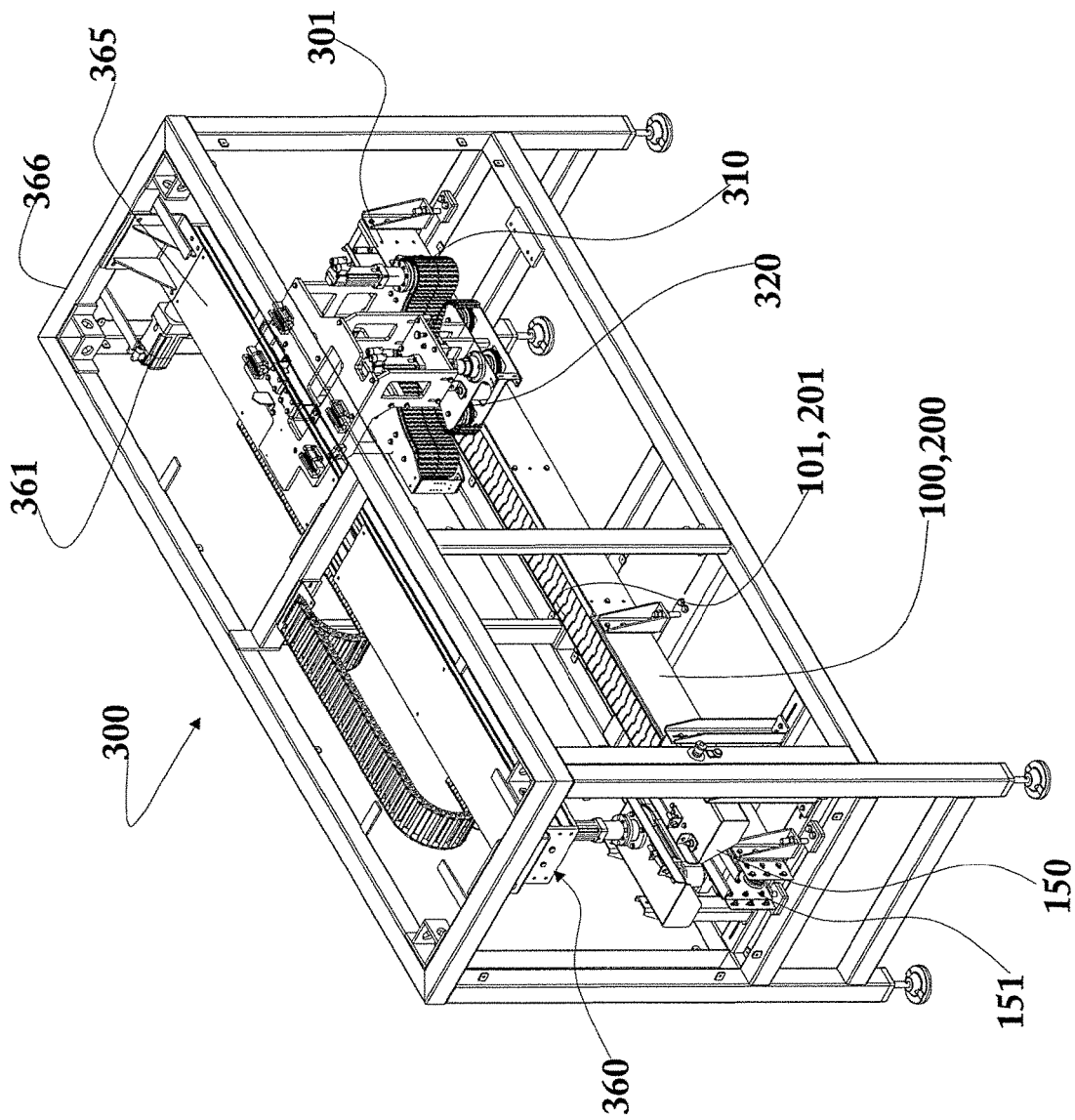
FIG. 3a: shows an axonometric view of the transfer device on the conveyor in input or in output.
Figure 3B:
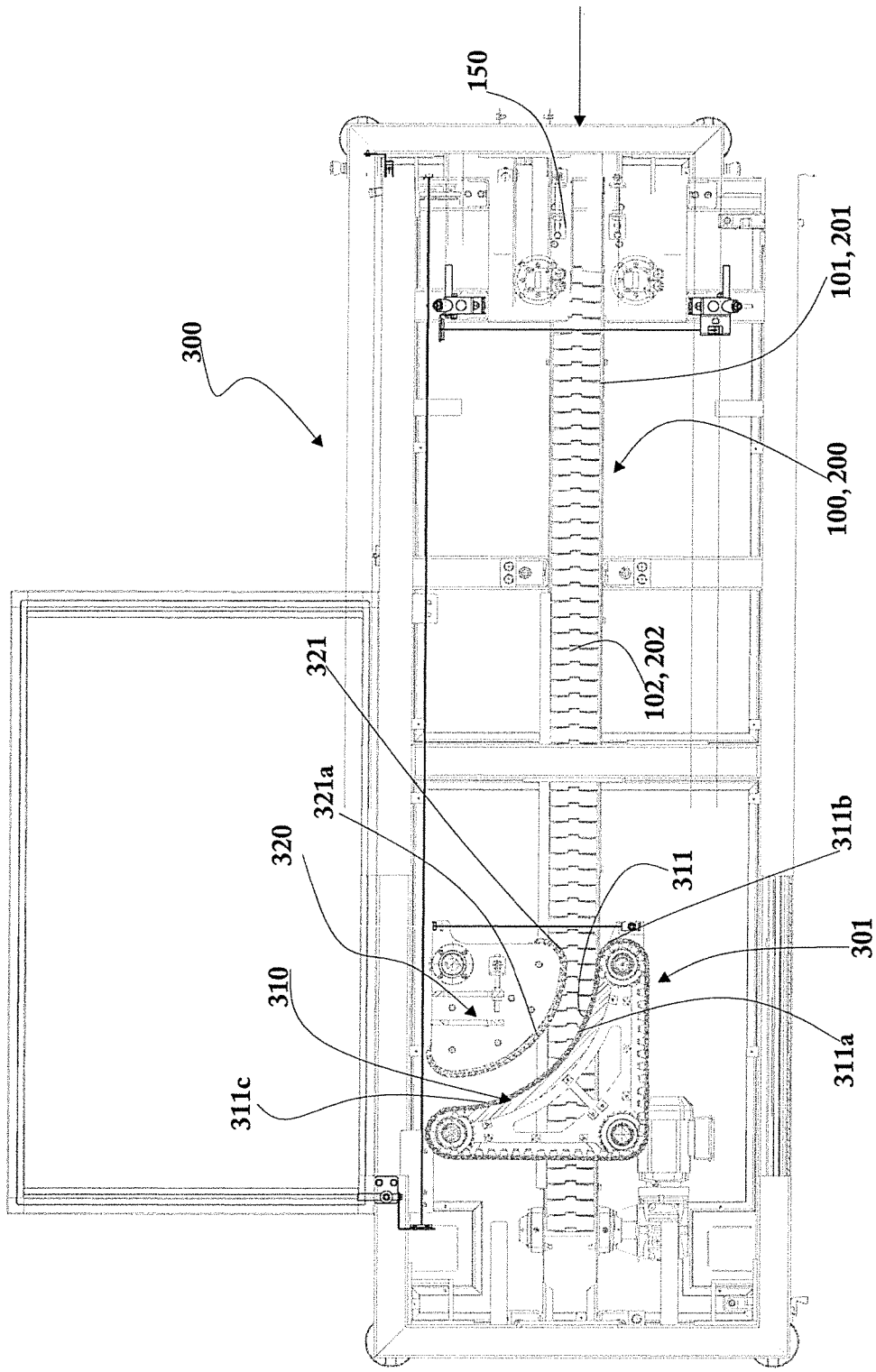
FIG. 3b: shows a schematic plan view of the transfer device on the conveyor in input or in output.

An embodiment depicted in FIGS. 3a and 3b relates to an above-mentioned belt conveyor 100 in input provided with a separating device 150 upstream of the transfer device 301; said separating device 150 serves to increase the distance between the consecutive articles 600 on the belt conveyor 100 in input so that the increased distance allows the transfer device 301 to move the release position of the articles 600 from a first storage conveyor 450 to a second storage conveyor 450 of the collecting table 400.

The transfer device 301 could require frequent moving between the adjacent conveyors 450, especially on the collecting tables 400 with several parallel storage conveyors 450, especially when a sudden buffering or collection of articles 600 is required.

By adjusting the upstream feeding distance of the articles 600 by means of the separating device 150, the transfer device 301 is granted sufficient time to pass to another storage conveyor 450.

The separating device 150 may, for example comprise belts 151 arranged at the opposite sides of the input conveyor 100, in which the belts 151 move in a direction that is similar to the forwarding direction of the feeder conveyor 100 but at a slower speed, thus engaging against the passing articles 600 and slowing down the speed thereof so as to increase the spacing of said articles 600.

According to an aspect of the invention, the belt conveyor 100 and/or 200 comprises a forwarding chain 101, 201 of the type known to a person skilled in the art; preferably said forwarding chain 101 and/or 201 extends along the entire width of the collecting table 400, as shown in FIG. 3b.

Figure 4:
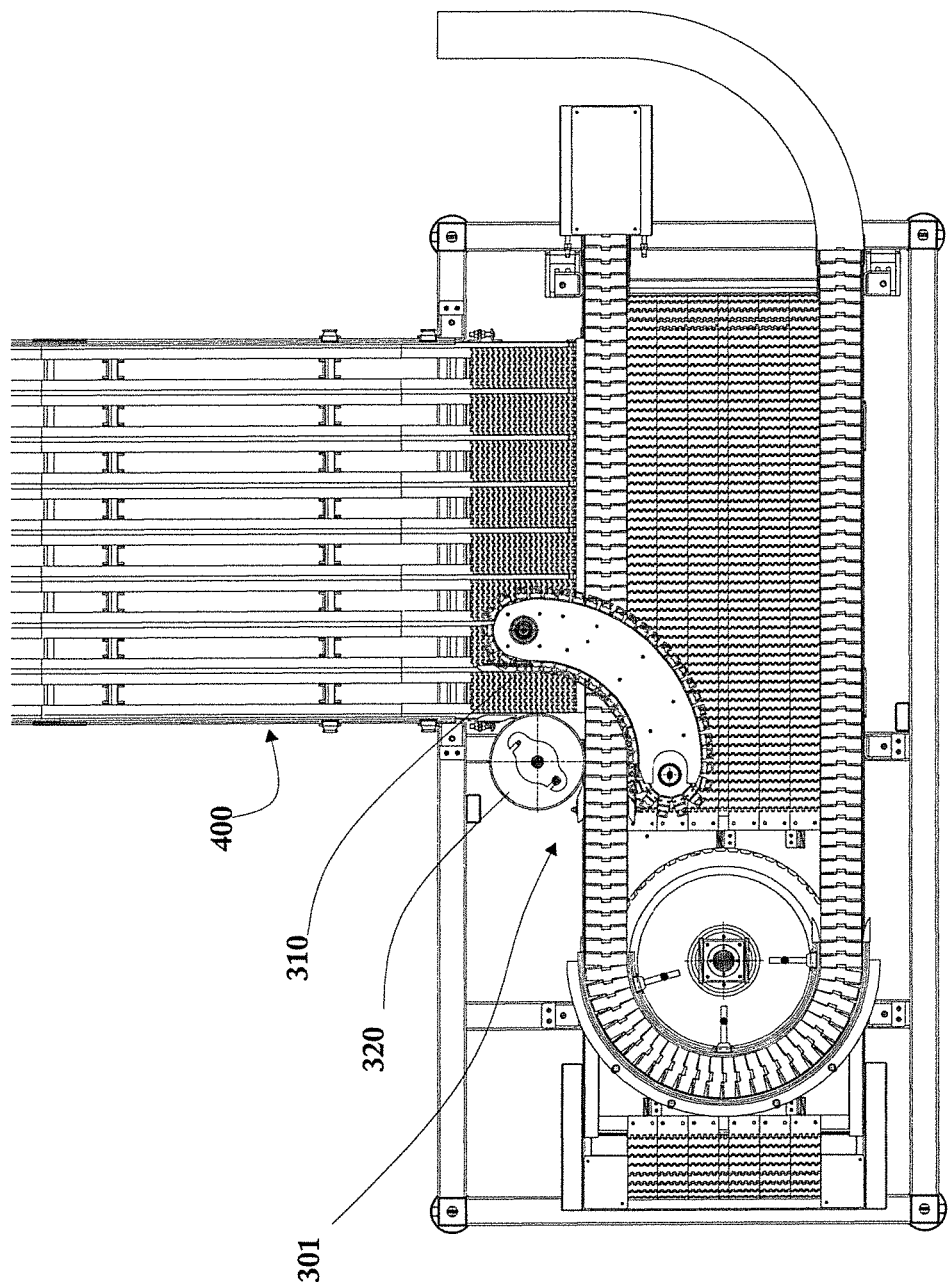
FIG. 4: shows a schematic plan view of the transfer device on the conveyor in input or in output, according to a particular embodiment.

A possible embodiment shown in FIG. 4 provides for the belt conveyor 100, 200 to comprise a forwarding chain 101, 201 that extends along the entire width of the collecting table 400, but in variable manner, i.e. configured so as to be capable of altering the length of that path of flow of articles 600 independently of any movement of the transfer device 301.

This allows the transfer device 301 to pick the articles 600 from the moving conveyor 100, thus altering, controlling or absorbing the flow of articles 600.

Therefore, the variation of the length of the feeding conveyor 100 adjacent to the collecting table 400 during the loading of articles 600 occurs in incremental manner in the direction of the flow of articles 600; this prevents the compression of the articles 600 that would occur when the transfer device 301 returns, for example directly from the last conveyor 450 to the first one.

In other words, to prevent a significant compression of the articles 600, the transfer device 301 travelling against the flow of the articles 600 is helped by the incremental variation of the length of the belt conveyor 100 when it returns directly from the last conveyor 450 to the first one.

This cancels the compression problems of the articles 600, which is particularly problematic because it may cause damage to the article 600 itself. The same applies to the output belt conveyor 200, but in inverse direction.

FIG. 2 shows a plan view of a collector 500 with collecting table 400, input belt conveyor 100 and output belt conveyor 200 on which a diverter apparatus 300 both in input and in output is installed.

When the diverter apparatus 300 is discussed below, reference is indistinctly made both to the one of the input belt conveyor 100 and of the output belt conveyor 200, they being structurally identical, also if mirror-like or simply rotated by 180°.

Said diverter apparatus 300 is configured to divert the articles 600 by 90°, passing from the belt conveyor 100, 200 to the collecting table 400 and vice versa, by means of a transfer device 301 that is movable along the belt conveyor 100, 200.

The transfer device 301 preferably is configured to transfer such articles 600 between the belt conveyor 100, 200 and any one of the plurality of rows 601 provided on the collecting table 400.

In particular, said belt conveyor 100, 200 and collecting table 400 are arranged adjacent to one another.

Therefore, the collector 500 comprises a diverter apparatus 300 in which a transfer device 301 is adapted to divert a flow of articles 600 from a belt conveyor 100, 200 to a collecting table 400 to create a plurality of parallel rows 601, or vice versa, said belt conveyor 100, 200 being arranged orthogonal to the collecting table 400 so that said articles 600, passing from the belt conveyor 100, 200 to the collecting table 400 and/or vice versa, are diverted by 90°, characterized in that said belt conveyor 100, 200 and collecting table 400 are arranged adjacent to one another.

This means that they are not separate from other devices and there are no mutual overall dimensions forcing them to be kept spaced apart. Therefore, they are placed in close position to one another.

Indeed, as described in the known art, solutions exist in which there are means between the belt conveyor and the collecting table that are adapted to handle the transfer device 301.

The collecting table 400 comprises storage conveyors 450 comprising at least one collecting chain 451 and preferably a plurality of parallel collecting chains 451.

The forwarding chain 101, 201 and the collecting chains 451 are arranged orthogonal and adjacent to one another.

As is known to a person skilled in the art, the term adjacent means that the chains are arranged as close as possible to one another, compatibly with the support structure and with the overall dimensions of the chain itself.

Being arranged adjacent serves to facilitate the passage of the article 600 passing between belt conveyor 100, 200 and collecting table 400 while ensuring that the bottom of the article 600 is possibly always resting on the forwarding chain 101, 201 and the collecting chains 451.

A preferred embodiment provides for said forwarding chain 101, 201 and collecting chain 451 to be arranged so that a distance D defined between the forwarding chain 101, 201 and the first resting plane point 422 of a winding portion 420 of the collecting chain 451 is minimal; said distance D is a function of the winding radius of said collecting chain 451.

Figure 3C:
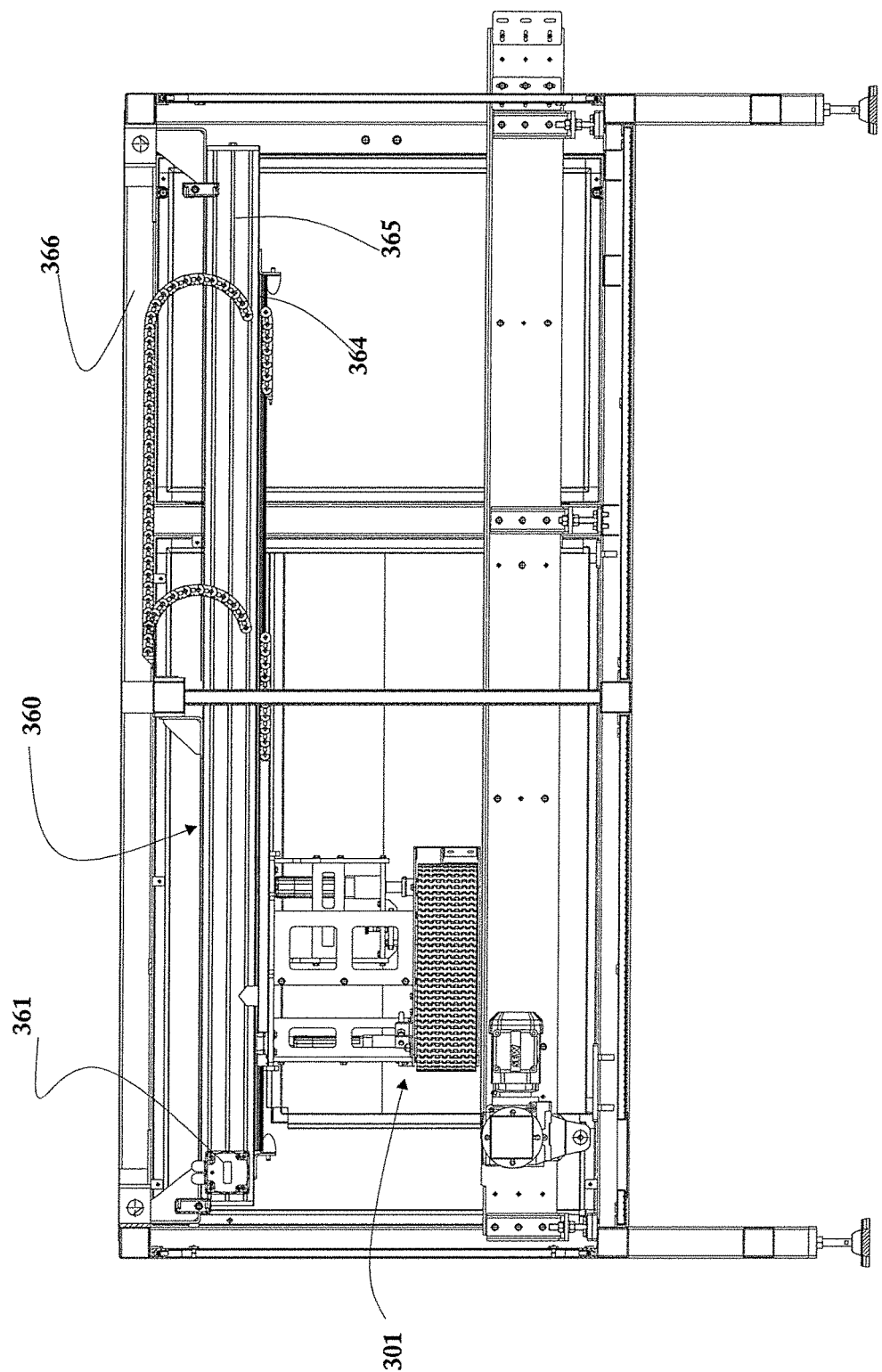
FIG. 3c: shows a schematic side view of the transfer device on the conveyor in input or in output.
Figure 3D:
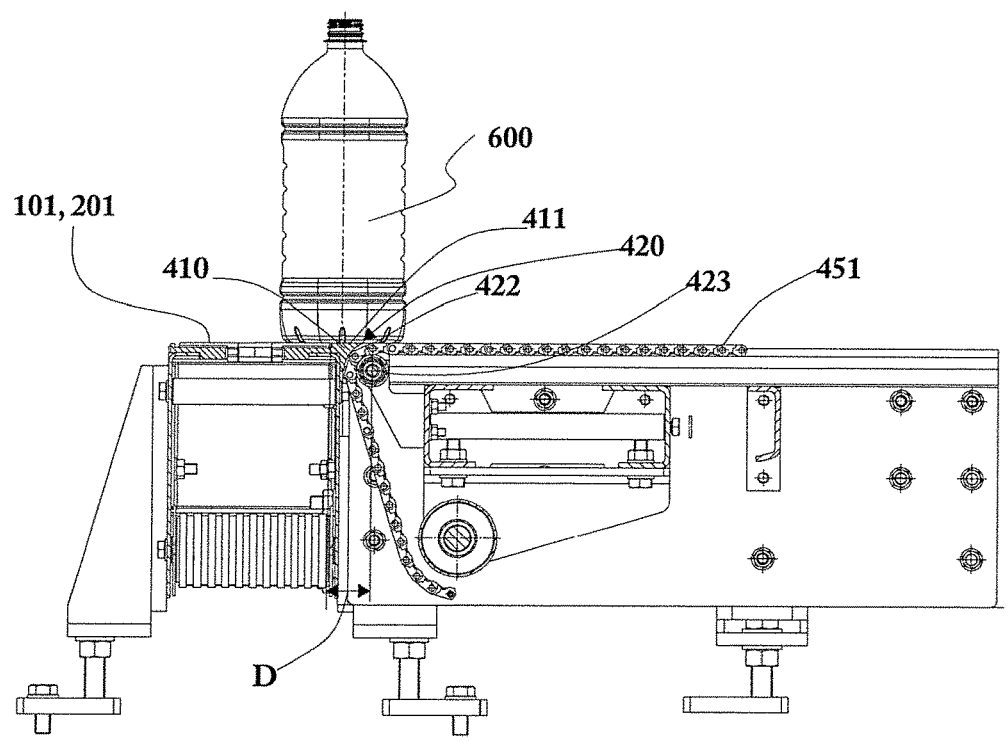
FIG. 3d: shows a side sectional view of the passage member between conveyor in input or in output and collecting table, in a first configuration.
Figure 3E:
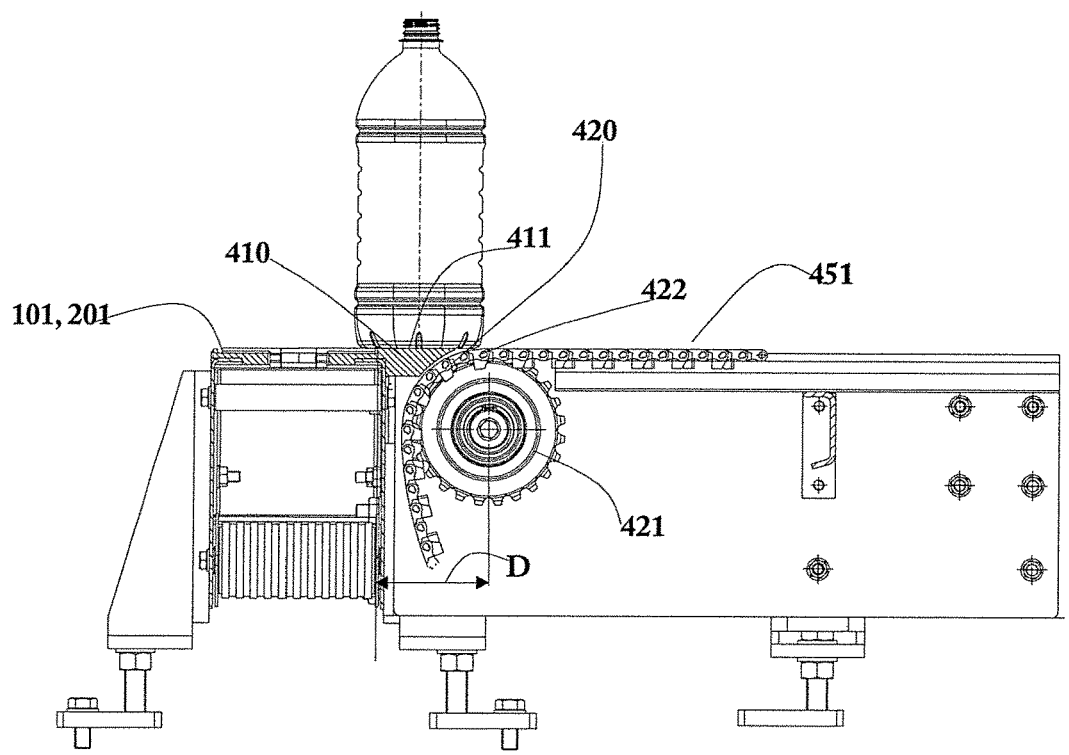
FIG. 3e: shows a side sectional view of the passage member between conveyor in input or in output and collecting table, in a second configuration.

Indeed, as is known to a person skilled in the art, in general the chain of a belt conveyor of articles 600 winds, for the handling thereof, for example about a pinion 421 with which it meshes, as shown in FIG. 3e. As is known to a person skilled in the art, said pinion 421 may be, for example a driven pinion that drags the collecting chain 451 or an idler bevel pinion for said collecting chain 451.

The term winding portion 420 of the collecting chain 451 means the part of the chain that meshes with the pinion 421 and that surrounds it. Said winding portion 420 ends with the first plane point 422 in which the chain leaves the pinion 421 to continue plane, generally on sliding guides.

By way of better explanation, it may be said that the first plane point 422 generally coincides with the vertical axis passing through the center of the pinion 421.

The winding portion 420 has a radius that is variable as a function of the dimension of the pinion 421, which generally is selected as a function of the speed that the collecting table 400 is to have. Therefore, the distance D between the forwarding chain 101, 201 and the first plane point 422 of the winding portion 420 of the collecting chain 451 may be minimized, bringing said winding portion 420, and therefore the pinion 421, next to the forwarding chain 101, 201; the maximum approach possible mainly depends on the winding radius of said collecting chain 451 on the pinion 421, and preferably also on the type of chain used, and specifically on the configuration of the links thereof.

According to a further alternative solution, as is known to a person skilled in the art, the chain of a belt conveyor of articles 600 may be wound about a roller 423, as shown in FIG. 3d. In this case, said roller 423 acts as return for said collecting chain 451.

In this case, the term winding portion 420 of the collecting chain 451 means the part of the chain that winds about the roller 423. Said winding portion 420 ends with the first plane point 422 in which the chain leaves the roller 423 to continue plane, generally on sliding guides.

By way of better explanation, it may be said that the first plane point 422 generally coincides with the vertical axis passing through the center of the roller 423.

The winding portion 420 has a variable radius as a function of the dimension of the roller 423 that generally is selected as a function of the minimum winding radius of said collecting chain 451, which depends on the type of chain 451 used and specifically, on the configuration of the links thereof. Therefore, the roller 423 may have a much smaller radius with respect to the pinion 421.

Thanks to this aspect, said solution allows the distance D to be further reduced with respect to the solution with pinion 421.

Here also, the distance D between the forwarding chain 101, 201 and the first plane point 422 of the winding portion 420 of the collecting chain 451 is further minimized, bringing said winding portion 420, and therefore the roller 423, next to the forwarding chain 101, 201; the maximum approach possible mainly depends on the winding radius of said collecting chain 451 on the roller 423.

Therefore, compatibly with the aforesaid aspects, the invention provides obtaining the positioning between the forwarding chain 101, 201 and the winding portion 420 of the collecting chain 451 so that they are at a minimum distance D, i.e. without the presence of mutual overall dimensions that are not functional to the simple handling of the respective chains.

According to a preferred embodiment, said distance D between the forwarding chain 101, 201 and the first plane point 422 of the winding portion 420 is less than the resting surface of the bottom of the article 600, preferably of the smallest.

Thanks to this characteristic, the article is transferred between belt conveyor 100, 200 and collecting table 400 in an increasingly stable and controlled manner because a part of the resting surface of the bottom is always in contact with one of the two chains, either the forwarding chain 101, 201 or the collecting chain 451.

In a possible embodiment, the diverter apparatus 300 further comprises a passage member 410, preferably of a stationary type, configured to close said distance D and support a portion of the resting surface of the bottom of the passing article 600, by means of the transfer device 301, between the forwarding chain 101, 201 and the collecting chain 451.

The passage member 410 comprises at least one substantially planar surface 411 adapted to create a support for the bottom of the article 600.

In this way, the bottom of the article 600 always remains resting either on the surface 411 and/or on the forwarding chain 101, 201 and/or on the collecting chain 451. Thanks to this, the forwarding of the article 600 is stabilized and it is prevented from losing its balance.

Moreover, since the passage member 410 has a reduced measurement because it closes the distance D, which is minimal and preferably less than the dimension of the resting surface of the bottom of the article 600, as described above, the following problems typical of the prior art are solved:
  damage to the bottom of the articles;
  reduction in the speed of the passing article due to the dragging friction on said surface;
  destabilization of the article after the release.

This solution is made possible given that the transfer device 301, which is described below, is handled along the belt conveyor 100, 200 by means of translation means 360 placed above the forwarding chain 101, 201 and/or the collecting chain 451, contrarily to what occurs in the prior art described above.

Therefore, overall dimensions for handling said transfer device 301 that hinder the adjacent positioning between the forwarding chain 101, 201 and the collecting chain 451, are not provided.

Indeed, FIGS. 3a and 3c show an example of the translation means 360 of the transfer device 301. Said translation means 360 comprise at least one motor or gear motor 361 that transmits the motion to a system of pulleys and respective belt; the transfer device 301 is kept in guide during the translation thereof preferably by linear guides 364. The guides 364, just like the translation means 360, are integral with at least one cross-beam 365 configured to support them and placed above the belt conveyor 100, 200 and that extends above and preferably along the length of the portion of belt conveyor 100, 200 on which the transfer device 301 is to translate.

Thanks to this solution, the translation means 360 of the transfer device 301 are easily accessible for maintenance, cleaning or format change.

A preferred embodiment provides for said cross-beam 365 to be installable on a frame 366 placed straddling the belt conveyor 100, 200 and which preferably is configured to also support the portion of belt conveyor 100, 200 on which the transfer device 301 is operational.

It in any case is intended for that described above to be given by way of non-limiting example; indeed a person skilled in the art may identify several existing alternative solutions for handling, keeping in guide and supporting the transfer device 301 in position above the belt conveyors 100, 200.

Therefore, possible detail variants that may be required for technical and/or functional reasons are considered from now as to fall within the same protective scope.

According to an aspect of the invention, the transfer device 301 comprises guide means 310, 320 configured to engage with the articles 600 by means of a transfer surface 311, 321 that comprises a circumferential portion 311a, 321a.

A preferred embodiment provides for said transfer surface 311, 321 to consist of a circumferential portion 311a, 321a.

This characteristic is made possible thanks to the distance being minimal between belt conveyor 100, 200 and collecting table 400, i.e. between forwarding chain 101, 201 and collecting chain 451.

Indeed, this allows making the transfer surface 311, 321 as a circumferential portion 311a, 321a while maintaining the contained overall dimensions of the transfer device 301.

Moreover, there is no need for the transfer surfaces 311, 321 to provide substantially rectilinear input and/or output profiles joined to each other by a curvilinear profile for the transfer at 90 degrees.

This allows a reliable transfer of the article 600 while minimizing the dragging against long transfer surfaces 311, 321.

Indeed, in the known case in which the distance between forwarding chain 101, 201 and collecting chain 451 is increased, the guide surfaces are to provide rectilinear length in order not to obtain curvilinear profiles that would be very large due to said significant distance.

According to a preferred aspect, the guide means 310, 320 comprise outer guide means 310 and preferably inner guide means 320 in which the respective transfer surfaces 311, 321 contact on each article 600 in two points that are substantially diametrically opposite or on opposite faces of said article 600.

Preferably, said transfer surfaces 311, 321 are arranged concentrically to one another.

Thanks to this solution, each article 600 is guided on two sides during the passing between belt conveyor 100, 200 and collecting table 400, thus ensuring the correct positioning thereof on the collecting chain 451.

To optimize the aforesaid positioning of the article 600, a possible embodiment provides for the circumferential portion 311a of the transfer surface 311 of the outer guide means 310 to comprise an input end 311b that is tangent to an outer edge 102, 202 respectively of the forwarding chain 101, 201 and an outlet end 311c that is tangent in turn to a forwarded edge 452 of the collecting chain 451 onto which it transfers the articles 600.

In this way, said transfer surface 311 does not require, and therefore may not have, rectilinear length in input or in output.

The article 600 therefore is not centered on the forwarding chains 101, 201 and collecting chains 451, rather is guided flush with the forwarding chains 101, 201 and collecting chains 451.

This solution allows keeping the position of the outer guide means 310 stationary, independently of the format, i.e. independently of the dimension of the article 600.

Instead, only the position of the inner guide means 320 is adjusted to adapt to the diameter or the width of said articles 600.

In this way, the format change, which involves only the inner guide means 320, is simplified.

In particular, the radius of the circumferential portion 321a of the transfer surface 321 of the inner guide means 320 is a function of the dimension of the article 600.

In particular, the radius is equal to the radius of the transfer surface 311 of the outer guide means 310, from which the diameter or the width of the container 600 is subtracted.

Said measurement is clearly a measurement which tolerance is known to a person skilled in the art. The suitable measurement for correctly transferring an article 600 may indeed vary as a function of the compression to which the article 600 is to be subjected, which is different for the different types of articles 600 and which is assessed each time based on the experience of a person skilled in the art.

In this way, the container is in contact with the transfer surface 311, 321 in two diametrically opposite points if the article 600 is cylindrical in shape, or in at least two points of two opposite faces if the article 600 is different in shape, for example parallelepiped.

Thus, the container is always perfectly guided.

As the dimension or the type of the container varies, it may be necessary to replace the inner guide means 320 with inner guide means 320 having different transfer surface 321, i.e. with a circumferential portion 321a having different radius. The replacement of said inner guide means 320 is facilitated by means of sliding and connecting systems that allow a quick and safe replacement.

Figure 8:
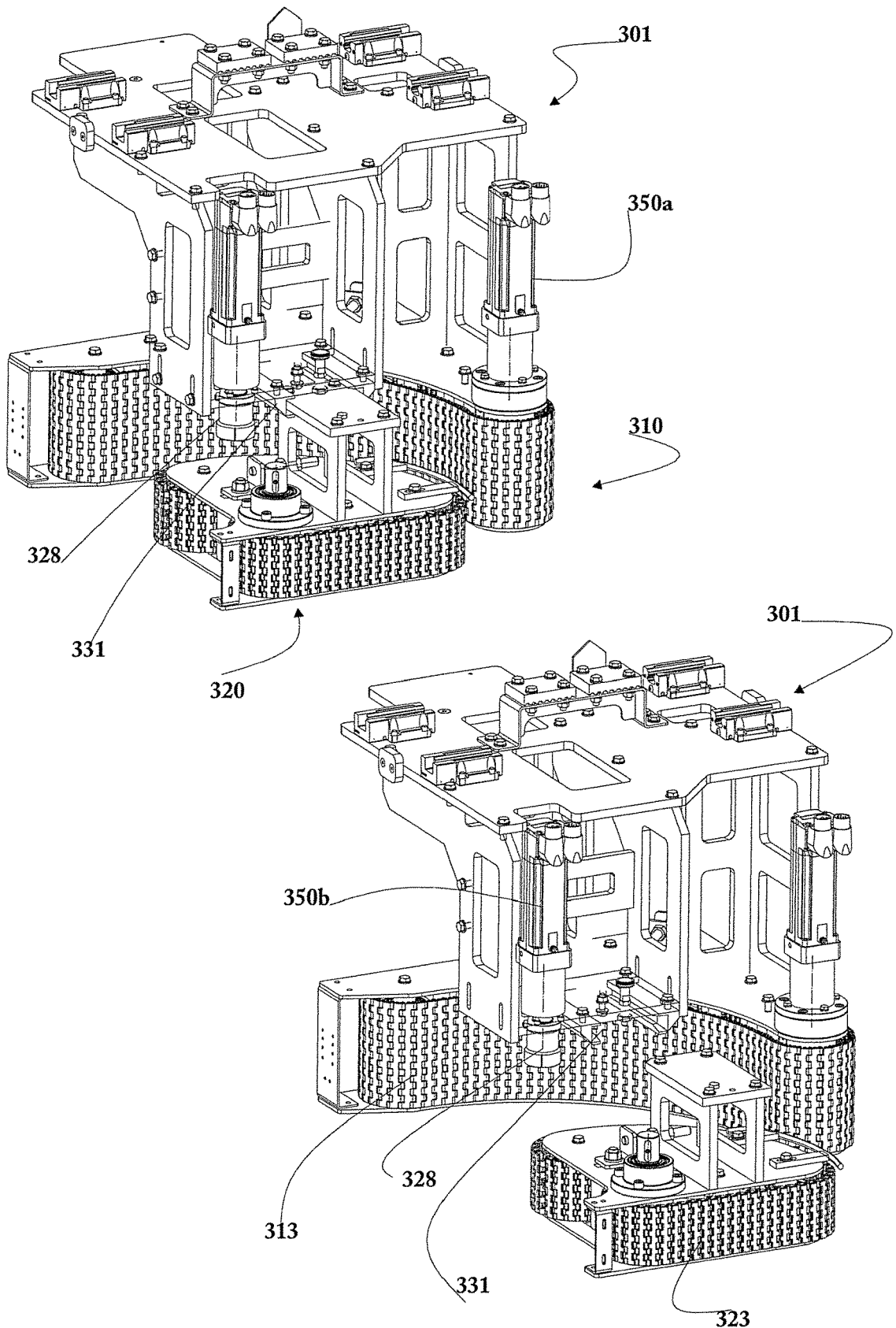
FIG. 8: shows an axonometric view of the format change of the inner guide means with movable guide.

In particular, a preferred embodiment of the inner guide means 320 suitable for the format change is shown in FIG. 8 and is described in detail below.

Figure 7A:
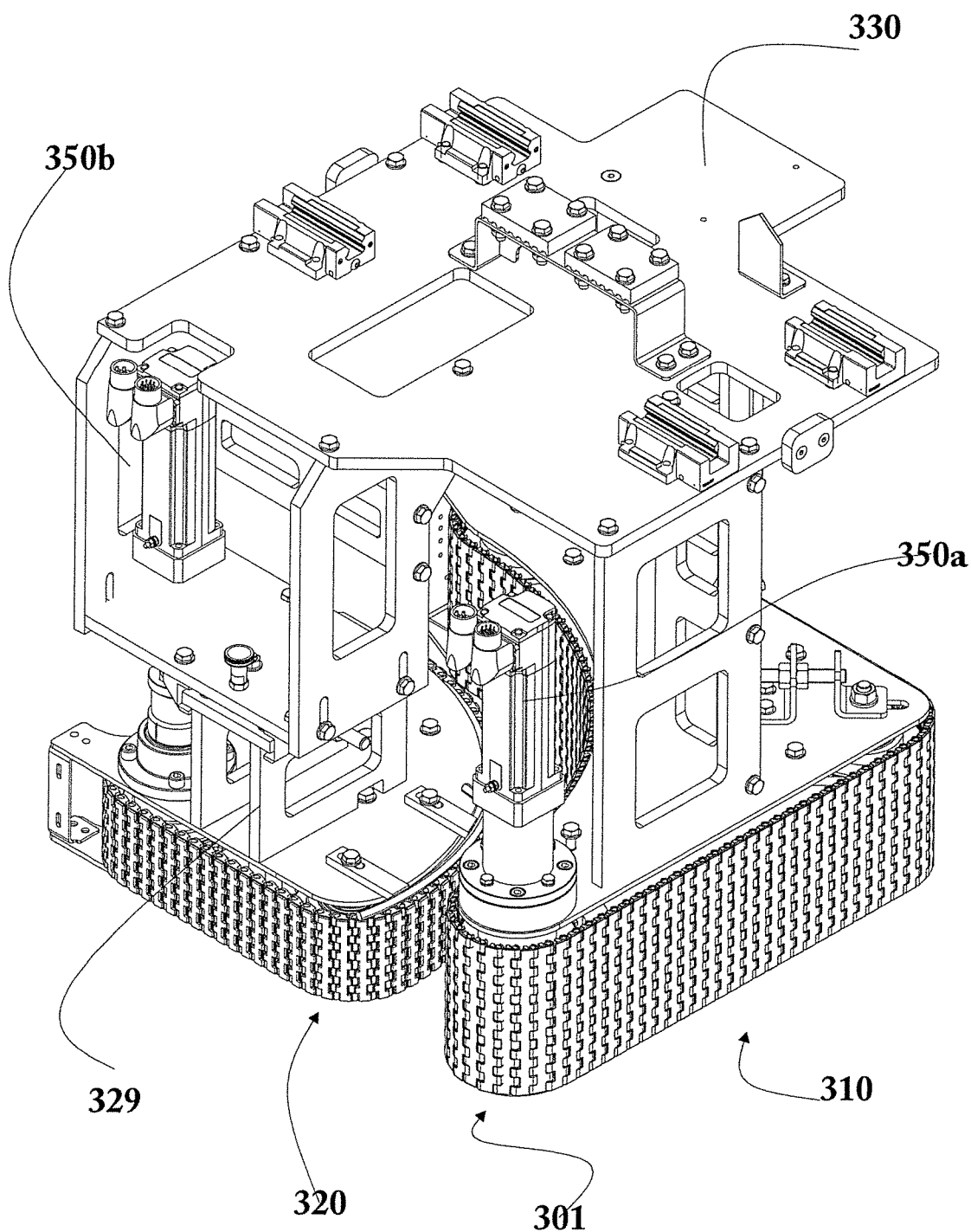
FIG. 7a: shows an axonometric view of the outer and inner guide means with movable guide.
Figure 7B:
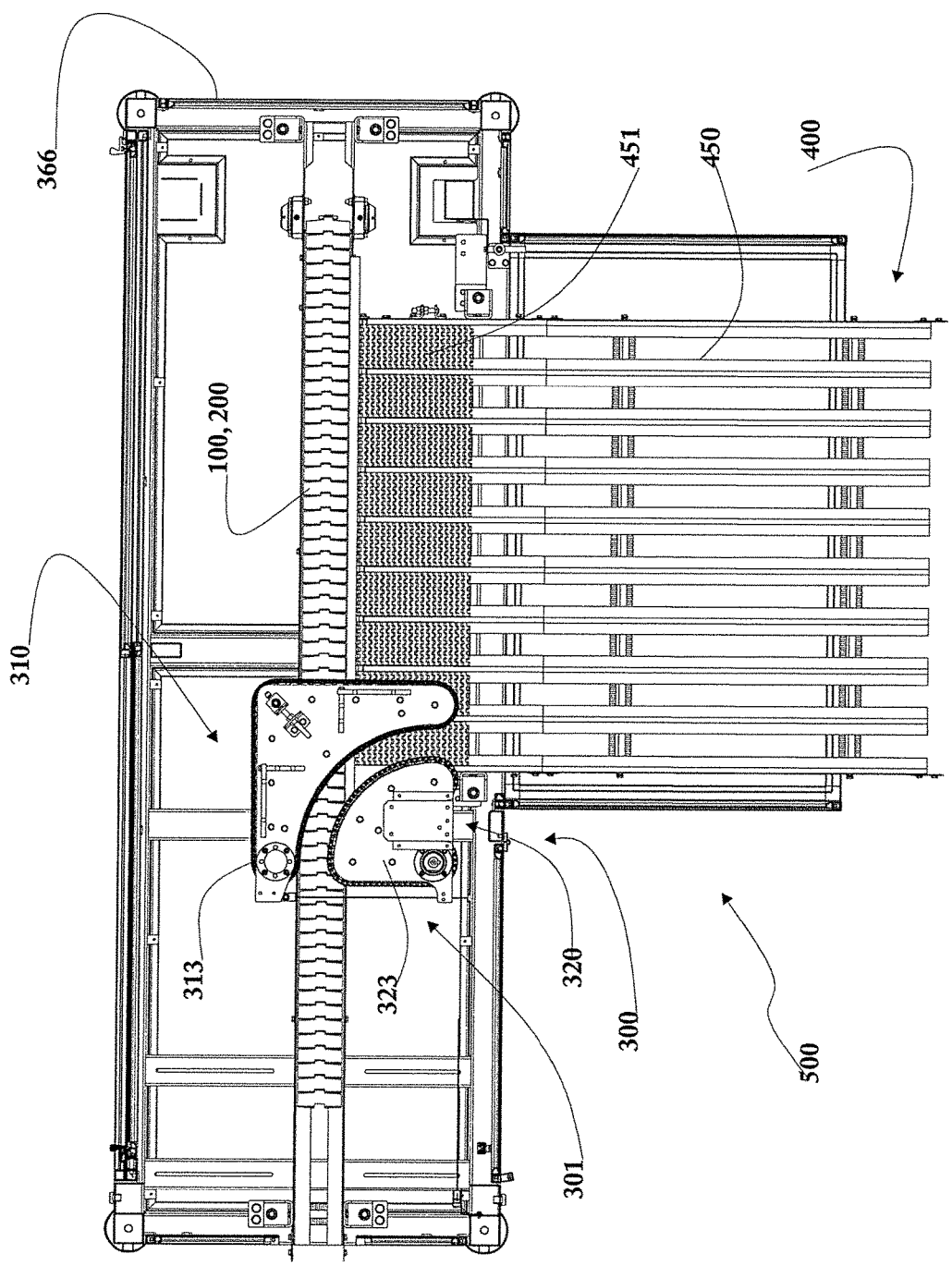
FIG. 7b: shows a plan view of the outer guide means with movable guide and inner guide means with movable guide.
Figure 7C:
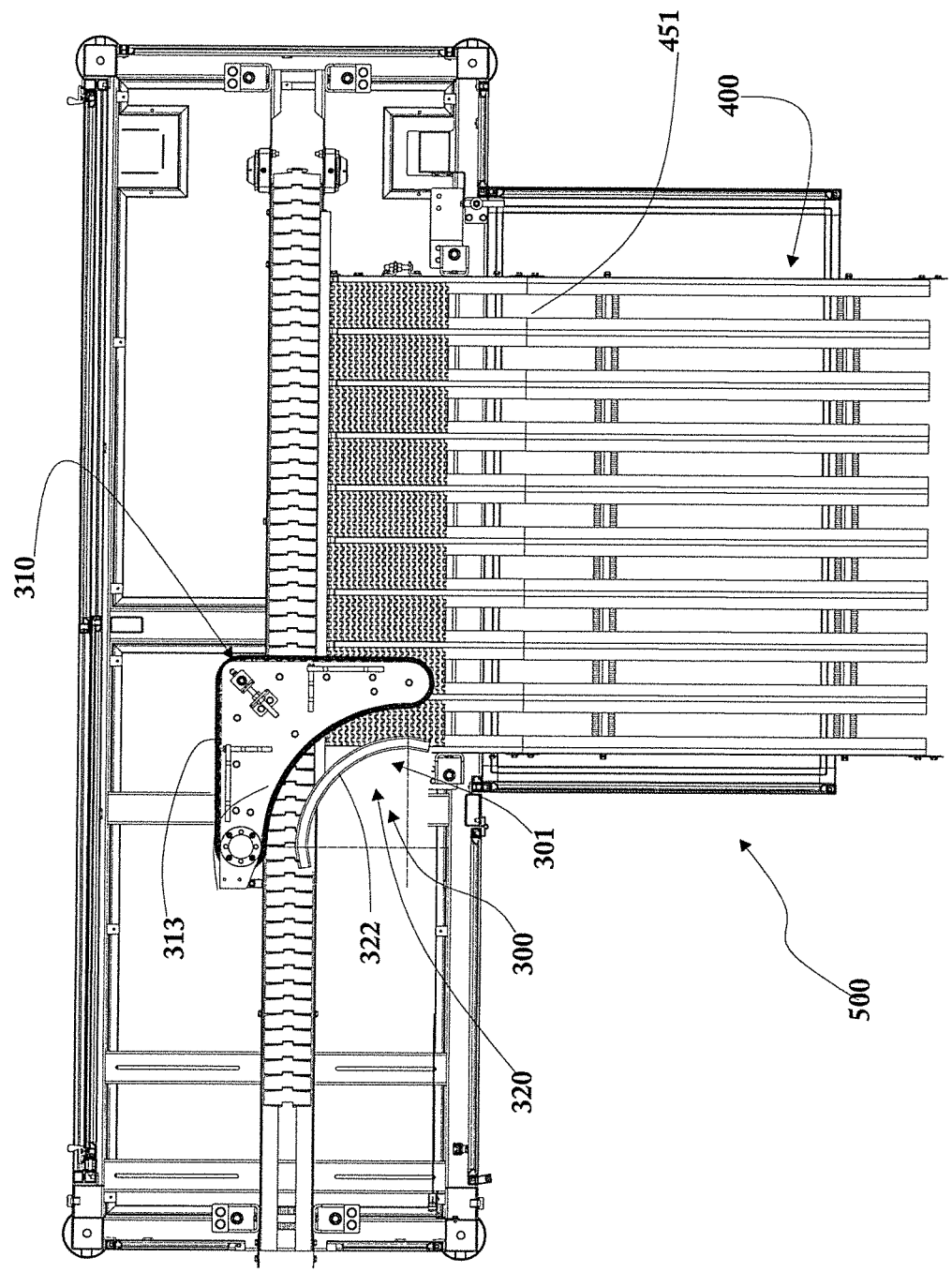
FIG. 7c: shows a plan view of the outer guide means with movable guide and inner guide means with stationary guide.
Figure 7D:
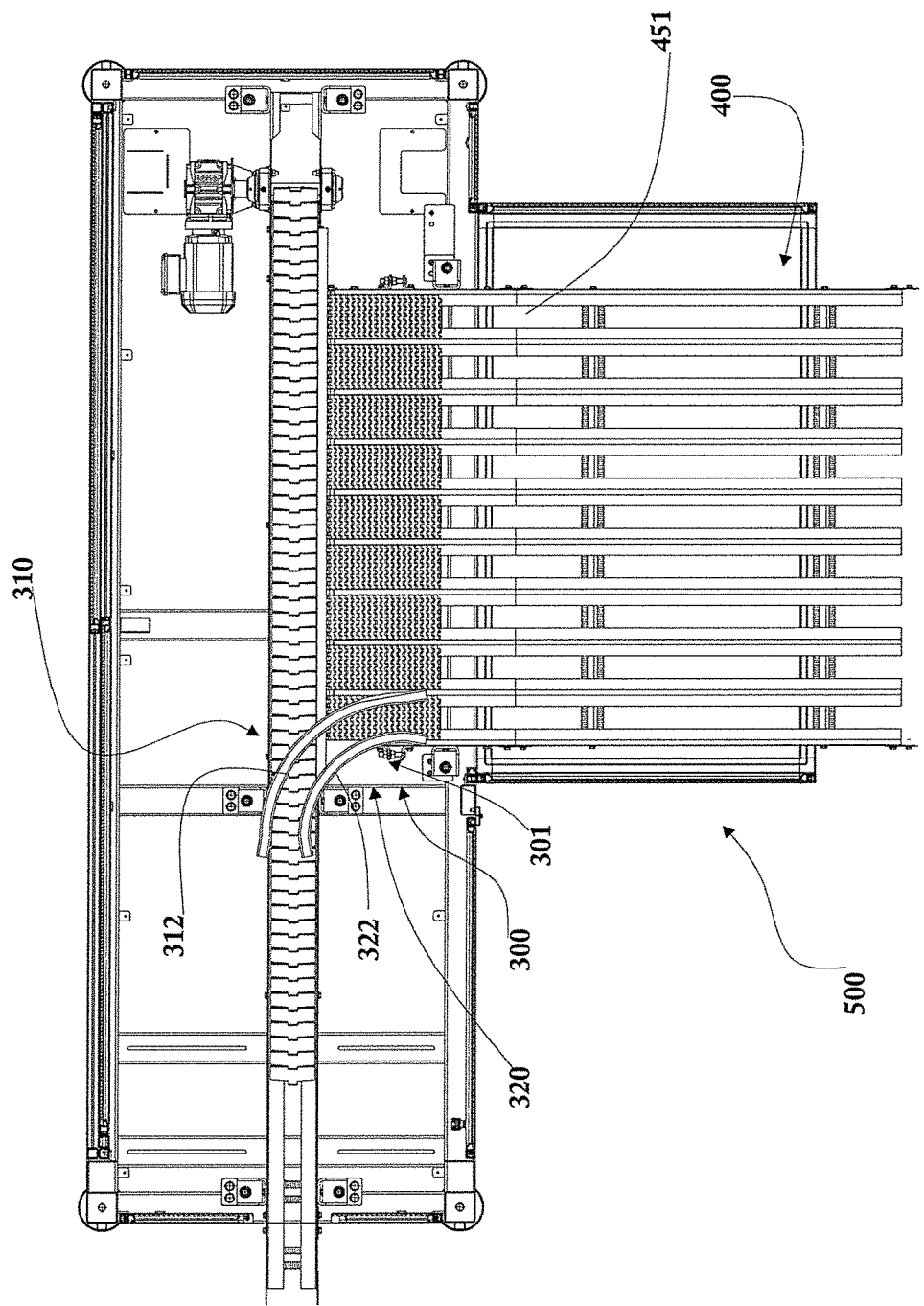
FIG. 7d: shows an axonometric view of the outer guide means with stationary guide and inner guide means with stationary guide.

With regards to the configuration of the outer guide means 310 and of the inner guide means 320, different preferred embodiments are defined, in particular:
the transfer surface 311 of the outer guide means 310 and/or the transfer surface 321 of the inner guide means 320 comprise a stationary guide 312, 322, as shown in FIG. 7d;
the transfer surface 311 of the outer guide means 310 comprises an inner movable guide 313 that translates according to the forwarding direction of the article 600, and the transfer surface 321 of the inner guide means 320 comprises a stationary guide 322, as shown in FIG. 7b;
the transfer surface 311 of the outer guide means 310 and/or the transfer surface 321 of the inner guide means 320 comprise an inner movable guide 313 and an outer movable guide 323 that translates according to the forwarding direction of the article 600, as shown in FIG. 7a.

Therefore, a simpler and more affordable solution is provided in which the transfer surface 311 and/or 321 is made by means of a stationary guide 312, 322. The term stationary guide 312, 322 means that the transfer surface 311 and/or 321, being comprised in the transfer device 301, translates along the belt conveyor 100, 200, but does not accompany the articles 600 during the transfer at 90° thereof, i.e. the articles 600 drag against the stationary guide 312, 322 during the transfer between belt conveyor 100, 200 and collecting table 400.

Alternatively, a more complex but also more reliable solution is provided in which the transfer surface 311 and 321 is made by means of a movable guide 313, 323 which translates according to the forwarding direction of the article 600. In this case, the term movable 313, 323 means that the transfer surface 311 and/or 321, being comprised in the transfer device 301, translates along the belt conveyor 100, 200 and additionally accompanies the articles 600 during the transfer at 90° thereof, i.e. the articles 600 do not drag against the stationary guide 313, 323 during the transfer between belt conveyor 100, 200 and collecting table 400 because said movable guide 313, 323 moves integral with said articles 600, thus accompanying them during said transfer.

The preferred embodiment among these possible embodiments is, for example the one in which the transfer surface 311 is made by means of an outer movable guide 313 and the transfer surface 321 is made by means of a stationary guide 322.

The solution that provides increased operating reliability, that is that involves fewer risks of damaging the articles 600 and that arranges them in repetitive and correct manner on the collecting table 400, is the one that provides having both the transfer surface 311 and 321 obtained by means of a movable guide 313, 323.

In this case, a preferred embodiment provides for the movable guide 313, 323 of the outer guide means 310 and/or of the inner guide means 320, respectively, to comprise a flexible member 314, 324 having preferably a contact surface 315, 325 of deformable type.

In an embodiment shown in FIGS. 5a, 5c, 6a, 6b, the flexible member 314, 324 is a chain 317, 327, preferably with rubberized contact surface 315, 325; alternatively, a solution with, for example preferably rubberized belt, or several overlapping belts or elastic cables or smooth and rubberized conveyors, nets, tyres covered with elastic mousse, or what is known to a person skilled in the art, falls within the scope of protection of the invention.

The flexible member 314, 324 most suitable mainly depends on the type of articles 600 to be transferred.

Figure 5A:
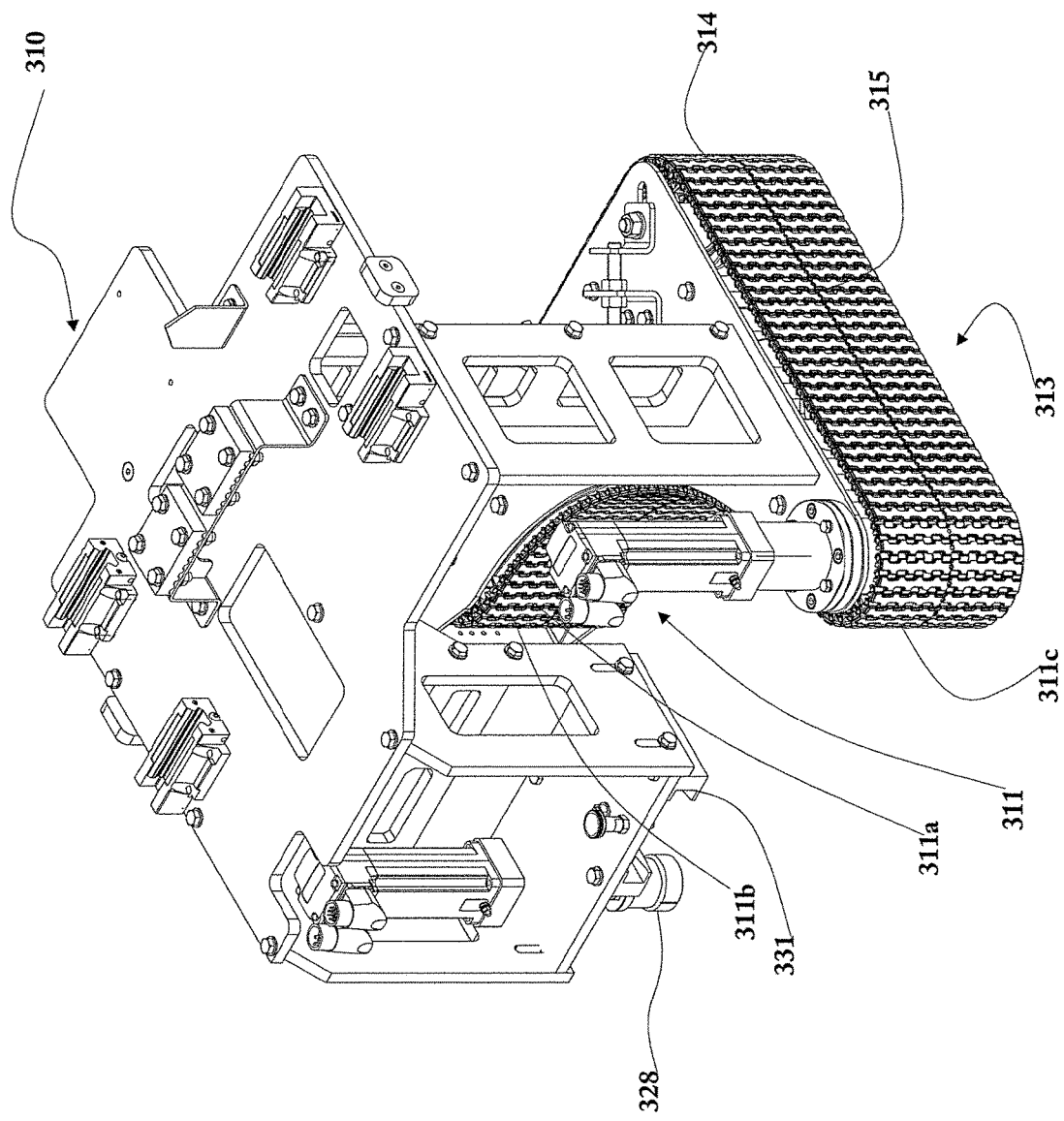
FIG. 5a: shows an axonometric view of the outer guide means with movable guide.
Figure 5B:
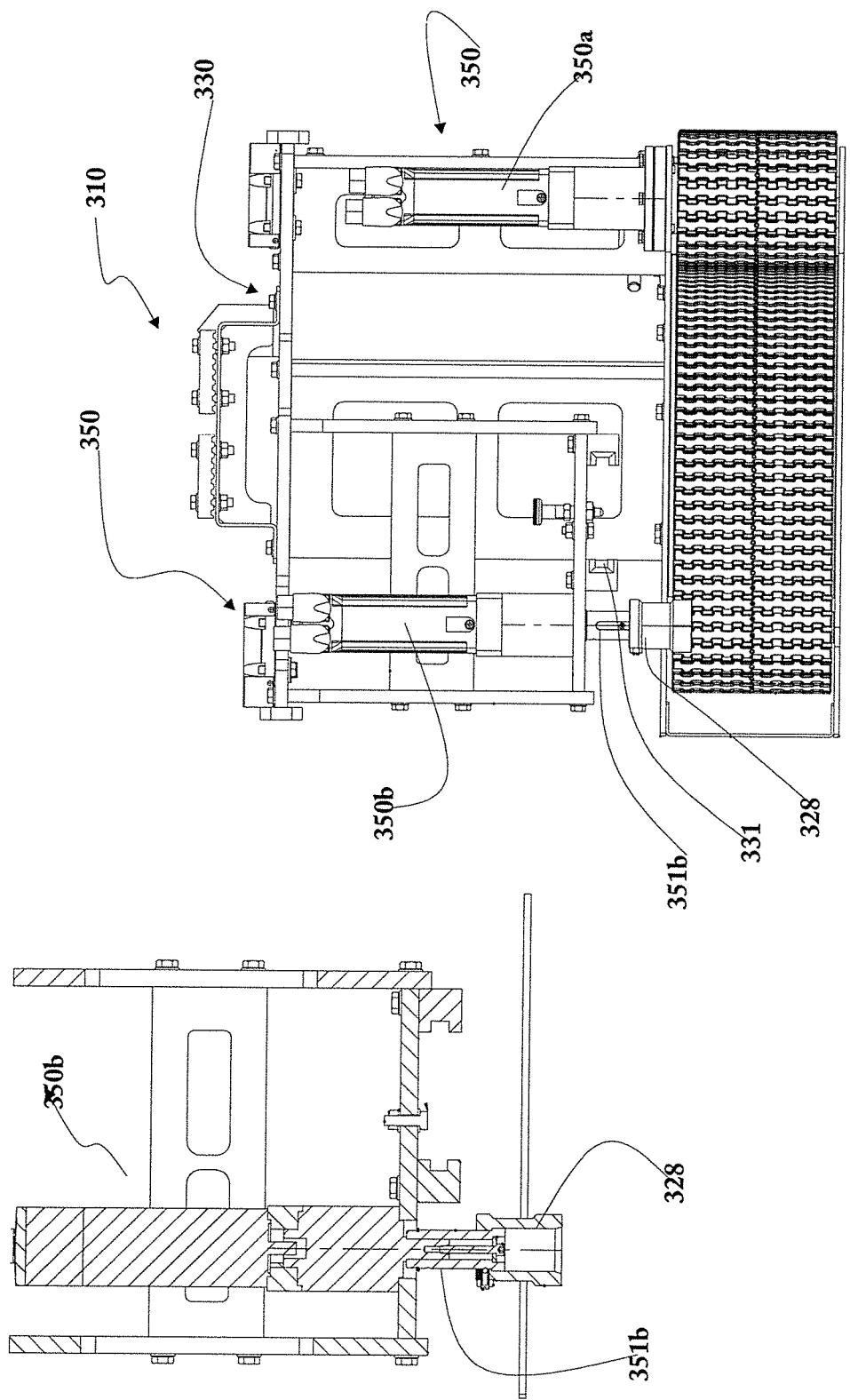
FIG. 5b: shows a schematic side view of the outer guide means with movable guide.
Figure 5C:
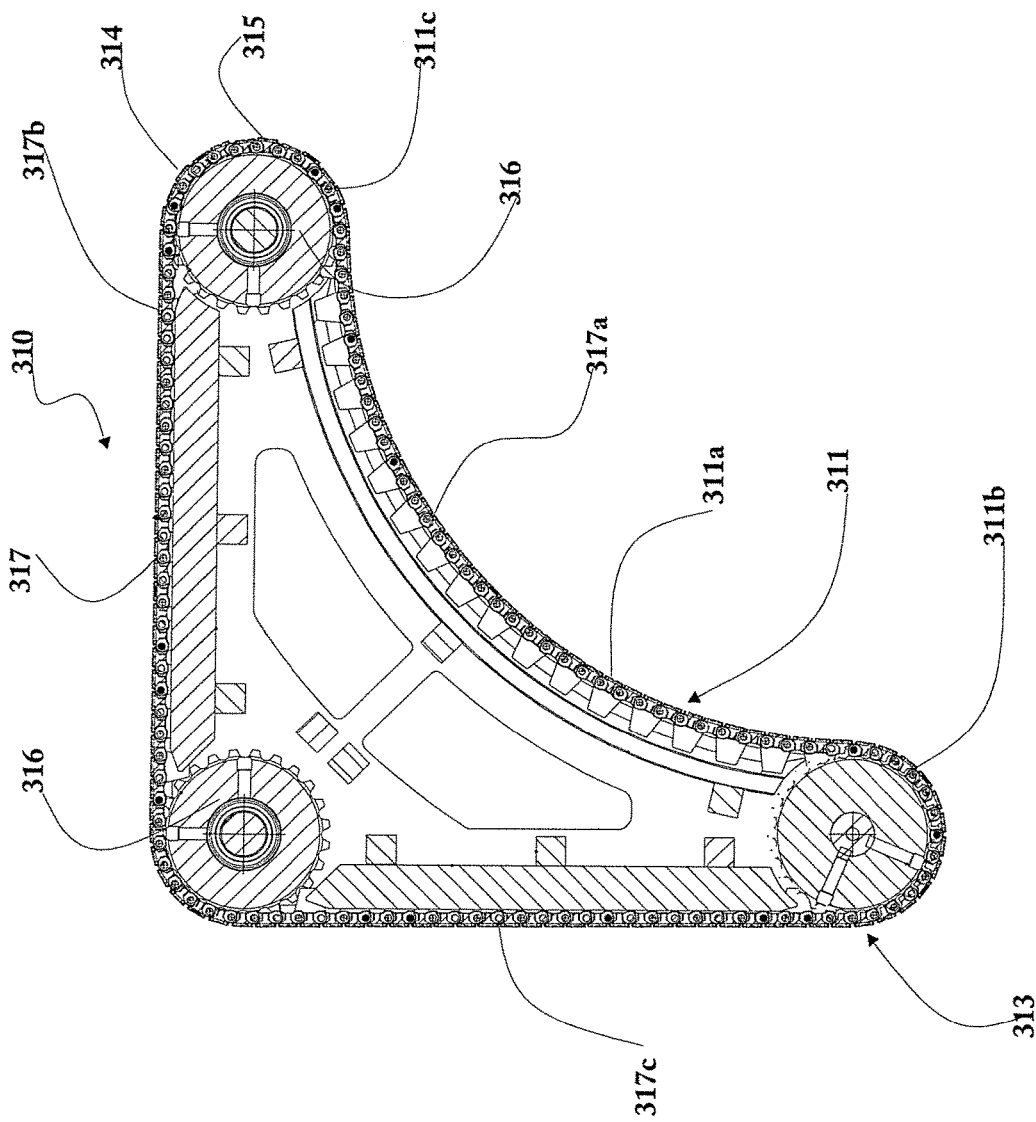
FIG. 5c: shows a schematic plan view of the outer guide means with movable guide.
Figure 6A:
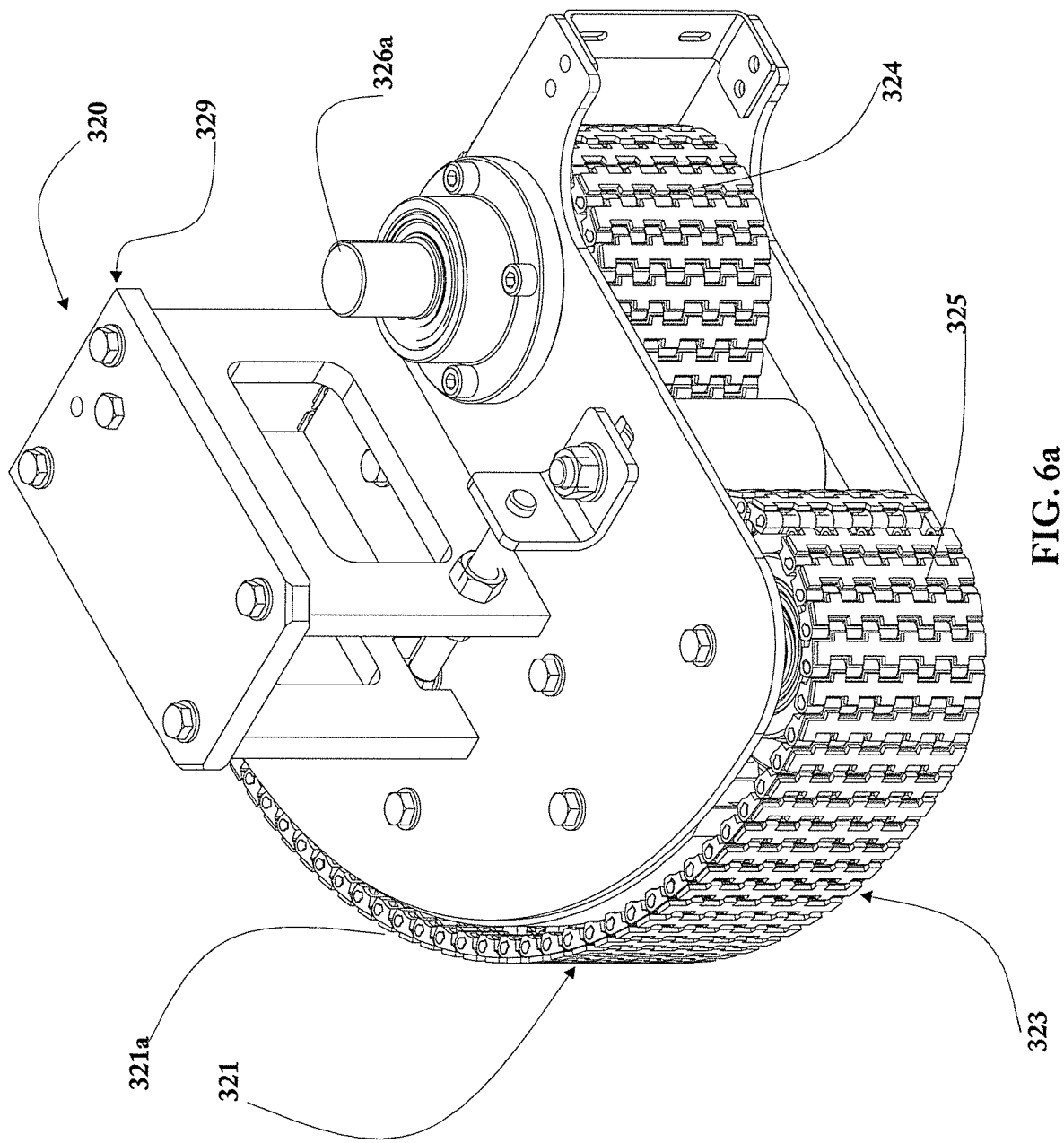
FIG. 6a: shows an axonometric view of the inner guide means with movable guide.
Figure 6B:
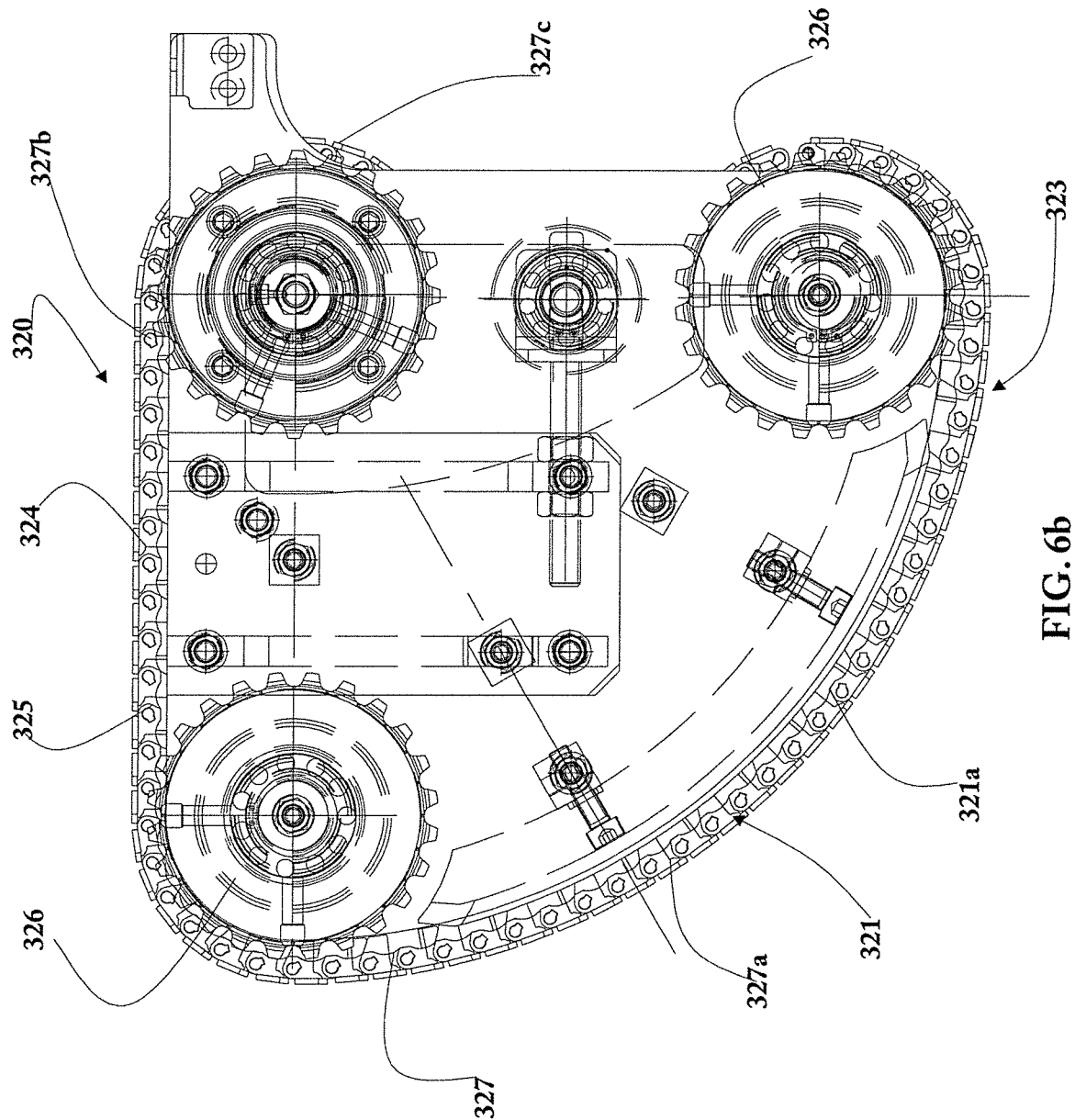
FIG. 6b: shows a schematic plan view of the inner guide means with movable guide.

In the example shown in FIGS. 5c, 6b, the flexible member 314, 324 forms a closed perimeter that surrounds toothed pinions 316, 326, at least one of which is driven and the others are idler.

In particular, the preferably rubberized chain 317 of the outer guide means 310 shown in FIGS. 5a, 5c provides 3 pinions 316, one of which is driven; said pinions 316 preferably are arranged so that the entire, preferably rubberized, chain 317 comprises an operating portion 317a coinciding with the transfer surface 311 that comprises, preferably consists of, a circumferential portion 311a adapted to engage with the articles 600.

In particular, two pinions 316 are placed at the two ends 311b and 311c of said circumferential portion 311a.

Furthermore, preferably the preferably rubberized chain 317 comprises two substantially rectilinear and mutually perpendicular return portions 317b, 317c, in particular said portions 317a, 317b, 317c being adapted to form a closed path.

Furthermore, the preferably rubberized chain 327 of the inner guide means 320 shown in FIGS. 6a, 6b provides 3 pinions 326, one of which driven; said pinions 326 preferably are arranged so that the entire preferably rubberized chain 327 comprises an operating portion 327a coinciding with the transfer surface 321 that comprises, preferably consists of, a circumferential portion 321a adapted to engage with the articles 600. In particular, two pinions 326 are placed at the two ends of said circumferential portion 321a.

Furthermore, preferably the preferably rubberized chain 327 comprises two return portions 327b, 327c, one of which rectilinear and one with suitable tensioning system, in particular said portions 327a, 327b, 327c being adapted to form a closed path.

It should be noted that this is only a non-limiting embodiment, but also alternative systems in which the paths 317a, 317b, 317c and 327a, 327b, 317c are shaped differently fall within the scope of protection of the invention.

A further aspect of the invention provides for the flexible member 314 of the outer guide means 310 and/or the flexible member 324 of the inner guide means 320 to be handled by means of actuating means 350 arranged above the forwarding chain 101, 201 and/or the collecting chain 451. Furthermore, preferably said actuating means 350 are arranged above the flexible member 314 of the outer guide means 310 and/or the flexible member 324 of the inner guide means 320.

Thanks to this solution, all the overall dimensions of the transfer device 301 are easily accessible for maintenance or the format change and do not create overall dimensions between belt conveyors 100, 200 and collecting table that hinder the adjacent positioning between the forwarding chain 101, 201 and the collecting chain 451.

According to an aspect of the invention, the format change provides for the inner guide means 320 to be replaced as the dimension of the container 600 varies.

In particular, during the format change, which involves replacing said inner guide means 320, the actuating means 350 remain in the position thereof without therefore requiring to be electrically disconnected, something that would make the format change complex and lengthy.

An embodiment is shown in FIG. 5b, in which the actuating means 350 comprise a motor or gear motor 350a directly associated with one of the pinions 316 to handle the flexible member 314 of the outer guide means 310, and a motor or gear motor 350b directly associated with one of the pinions 326 to handle the flexible member 324 of the inner guide means 320. The term directly associated means that there are no intermediate drive systems such as gears or pulleys etc. In any case, it should be noted that what is shown in the drawing is a preferred embodiment that is more affordable and simpler to assemble, therefore also systems in which the motor or gear motor 350a, 350b is not directly associated with one of the pinions 316, 326 fall within the scope of protection of the invention.

As mentioned above, as the dimension or the type of the article 600 varies, it may be necessary to replace the inner guide means 320 with inner guide means 320 having different transfer surface 321, in particular with a circumferential portion 321a having different radius. The replacement of said inner guide means 320 is facilitated by means of sliding and interlocking systems that allow a quick and safe replacement.

In particular, as shown in FIGS. 5b and 6a, the motor or gear motor 350b directly associated with one of the pinions 326 to handle the flexible member 324 of the inner guide means 320 comprises a rotatable shaft 351b configured to be mechanically connected with a pin 326a of a pinion 326. Preferably, said connection occurs by means of a connecting member 328, preferably a hollow sleeve configured so as to receive the rotatable shaft 351b on one side and the pin 326a on the other.

The motion is transmitted, by means of locking systems known to a person skilled in the art, such as spanners or couplings, etc., from the rotatable shaft 351b to the pin 326a, they being made integral by means of the connecting member 328.

It should be noted, as shown in FIG. 6a, that to facilitate the format change, the pinions 326 and the flexible member 324 are mechanically associated with a frame 329 that allows the disassembly of the inner guide means 320 in a single step, without the need to separately disassemble the flexible member 324 of the individual pinions 326.

In particular, the motor or gear motor 350b is not involved in the format change and remains in its position.

Said motor or gear motor 350b is preferably installed integral with a support structure 330 that is configured to also support the outer guide means 310, and in particular, at least the motor or gear motor 350a, the pinions 316 and the flexible member 314.

Equally, the frame 329 is removably connected to the support structure 330.

It is necessary to replace, at the time of the format change, the inner guide means 320 to ensure the circumferential portion 321a has correct radius for the article 600 to be handled.

Therefore, the inner guide means 320 are disconnected from the motor or gear motor 350b by sliding the connecting member 328 toward the motor or gear motor 350b up to completely freeing the pin 326a of the pinion 326 from the connecting member 328, which instead remains integral with the rotatable shaft 351b.

The sliding of the connecting member 328 toward the motor or gear motor 350b preferably occurs in vertical direction, the motor or gear motor 350b being arranged with the rotatable shaft 351b vertical and facing downward.

At this point, once the pin 326a of the pinion 326 is freed from the connecting member 328, the entire frame 329 may be moved away from the support structure 330, preferably by sliding along guide members 331, as shown in FIG. 8.

Said sliding preferably occurs in horizontal direction so as to avoid the surrounding overall dimensions and thus facilitating the intervention by the operator.

It in any case is intended for that described above to be given by way of non-limiting example; indeed a person skilled in the art may identify several existing alternative solutions for connecting the various components and performing an easy and quick format change.

The outer movable guide 313 of the outer guide means 310 and the inner movable guide 323 of the inner guide means 320 have different forwarding speeds in order to allow the correct positioning of the articles 600 on the collecting chain 451 or on the forwarding chain 201.

Said difference is such as to ensure that article 600 is forwarded in the transfer device 301 without rotating about an axis of symmetry X thereof.

This is even more important when the articles 600 are not cylindrical containers, but parallelepipeds that could therefore be arranged with the faces oblique to the forwarding direction. Indeed, the rotation especially of articles 600 with non-circular, e.g. rectangular base, such as cartons, consequently, would have a messy collection of said articles 600 on the collecting chain 451 or on the forwarding chain 201.

In addition to the correct proportion between the speeds of the outer movable guide 313 with respect to the inner movable guide 323, the correct positioning of the articles 600 is also made possible by the fact that preferably the guide means 310, 320 are configured to be engaged with the articles 600 by means of a transfer surface 311, 321 that consists of a circumferential portion 311a, 321a and there is no rectilinear length.

Indeed, if there were also a rectilinear length, the forwarding speeds of the outer movable guide 313 and of the inner movable guide 323 should be equal in the rectilinear profile length, while they should be proportional to the radius of curvature in the curvilinear profile length so that the article 600 passing in the transfer device 301 is forwarded without rotating.

Therefore, the speed could not be correctly managed given that several articles pass in the transfer device 301 simultaneously that would simultaneously be in contact both with the rectilinear and curvilinear profiles.

Therefore, the advantage of having the outer movable guide 313 and the inner movable guide 323 in which the transfer surface 311, 321 consists of a circumferential portion 311a, 321a allows the correct management of the speed and a correct and accurate forwarding of the articles 600.

An object of the invention is also the diverter apparatus 300 adapted to divert a flow of articles 600 from a belt conveyor 100, 200 to a collecting table 400 of articles 600, or vice versa, according to the characteristics described above.

It in any case is intended for that described above to be given by way of non-limiting example; therefore possible detail variants that may be required for technical and/or functional reasons are considered from now as to fall within the same protective scope defined by the claims below.

The invention claimed is:

1. A collector comprising a diverter apparatus, the diverter apparatus comprising a transfer device that is adapted to divert a flow of articles from a belt conveyor to a collecting table of the collector to create a plurality of rows that are mutually parallel, or vice versa, said belt conveyor being arranged orthogonal to the collecting table, so that said articles, passing from the belt conveyor to the collecting table and/or vice versa, are diverted defining an angle of 90°, said belt conveyor and collecting table, are arranged adjacent to one another, wherein the transfer device comprises guide means configured to engage with the articles by a transfer surface that comprises, a circumferential portion, and wherein the guide means comprise outer guide means and inner guide means in which respective transfer surfaces contact on each article in two points that are substantially diametrically opposite or on opposite faces of said article, said transfer surfaces are arranged concentrically with respect to one another, the transfer surface of the outer guide means and/or the transfer surface of the inner guide means comprise a movable guide, which translates according to the forwarding direction of the article, and wherein the movable guide of the outer guide means and the movable guide of the inner guide means have different forwarding rates, wherein said difference is such that, inside the transfer device, the article moves forward without rotating about an axis of symmetry thereof.

2. The collector according to claim 1, wherein the belt conveyor comprises a forwarding chain, which extends along an entire width of the collecting table, which, in turn, provides for storage conveyors comprising at least one collecting chain, said forwarding chain and at least one collecting chain, are arranged orthogonal and adjacent to one another.

3. The collector according to claim 2, wherein said forwarding chain and at least one collecting chain are arranged so that a distance between the forwarding chain and a first plane point of a winding portion of the at least one collecting chain is a function of a winding radius of said at least one collecting chain and/or the configuration of said at least one collecting chain.

4. The collector according to claim 3, wherein the distance is less than a surface of the bottom of the article which contacts either the forwarding chain or the at least one collecting chain.

5. The collector according to claim 3, further comprising a stationary passage member, configured to close said distance and support a portion of the resting surface of the bottom of the passing article, by the transfer device, between the forwarding chain and the at least one collecting chain.

6. The collector according to claim 5, wherein the stationary passage member comprises at least one substantially planar surface, adapted to create a support for the bottom of the article.

7. The collector according to claim 1, wherein the belt conveyor comprises a forwarding chain, which extends along an entire width of the collecting table, which, in turn, provides for storage conveyors comprising at least one collecting chain, and wherein the circumferential portion of the transfer surface of the outer guide means, comprise an input end that is tangent to an outer edge respectively of the forwarding chain and an outlet end that in turn is tangent to a forwarded edge of the at least one collecting chain onto which the at least one collecting chain transfers the articles so that said transfer surface does not have rectilinear length in input or in output.

8. The collector according to claim 1, wherein the circumferential portion of the transfer surface of the inner guide means has a radius thereof that is a function of the dimension of the article, and that is equal to the radius of the transfer surface of the outer guide means, less the article diameter or width.

9. The collector according to claim 8, wherein the radius of the circumferential portion of the transfer surface of the inner guide means is a function of the article size.

10. The collector according to claim 1, wherein the transfer surface of the outer guide means and/or the transfer surface of the inner guide means comprise a stationary guide.

11. The collector according to claim 1, wherein the movable guide of the outer guide means and/or of the inner guide means, respectively, comprises a flexible member having a deformable contact surface.

12. The collector according to claim 11, wherein the flexible member of the outer guide means and/or the flexible member of the inner guide means is handled by actuating means that are arranged above the forwarding chain and/or the collecting chain.

13. A collector comprising a diverter apparatus, the diverter apparatus comprising a transfer device that is adapted to divert a flow of articles from a belt conveyor to a collecting table of the collector to create a plurality of rows that are mutually parallel, or vice versa, said belt conveyor being arranged orthogonal to the collecting table, so that said articles, passing from the belt conveyor to the collecting table and/or vice versa, are diverted defining an angle of 90°, said belt conveyor and collecting table, are arranged adjacent to one another, wherein the transfer device is mobile along the belt conveyor by translation means arranged above the forwarding chain and/or the collecting chain.

14. A collector comprising a diverter apparatus, the diverter apparatus comprising a transfer device that is adapted to divert a flow of articles from a belt conveyor to a collecting table of the collector to create a plurality of rows that are mutually parallel, or vice versa, said belt conveyor being arranged orthogonal to the collecting table, so that said articles, passing from the belt conveyor to the collecting table and/or vice versa, are diverted defining an angle of 90°, said belt conveyor and collecting table, are arranged adjacent to one another, wherein the transfer device comprises guide means configured to engage with the articles by a transfer surface that comprises, a circumferential portion, and wherein the guide means comprise outer guide means and inner guide means in which respective transfer surfaces contact on each article in two points that are substantially diametrically opposite or on opposite faces of said article, said transfer surfaces are arranged concentrically with respect to one another, the transfer surface of the outer guide means and/or the transfer surface of the inner guide means comprise a movable guide, which translates according to the forwarding direction of the article, the movable guide of the outer guide means and/or of the inner guide means, respectively, comprises a flexible member having a deformable contact surface, wherein the flexible member of the outer guide means and/or the flexible member of the inner guide means is handled by actuating means that are arranged above the forwarding chain and/or the collecting chain, and wherein, during a format change involving replacement of the inner guide means, the actuating means remain in their position.

\* \* \* \* \*